US012802978B2

(12) United States Patent
Yun

(10) Patent No.: US 12,802,978 B2
(45) **Date of Patent: *Nov. 17, 2026**

(54) POSITIVE ACTIVE MATERIAL FOR AN ALL-SOLID-STATE BATTERY, METHOD OF PREPARING THE SAME, AND ALL-SOLID-STATE BATTERY

(71) Applicant: SAMSUNG SDI CO., LTD., Yongin-si (KR)

(72) Inventor: Pilsang Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 628 days.

This patent is subject to a terminal disclaimer.

(21) Appl. No.: 17/521,709

(22) Filed: Nov. 8, 2021

(65) Prior Publication Data

US 2022/0069301 A1 Mar. 3, 2022

Related U.S. Application Data

(63) Continuation-in-part of application No. 15/654,648, filed on Jul. 19, 2017, now Pat. No. 11,302,919.

(30) Foreign Application Priority Data

Jul. 20, 2016 (KR) ........................ 10-2016-0092243
Nov. 30, 2016 (KR) .......................... 10-2016-162291
Jul. 23, 2021 (KR) ........................ 10-2021-0097217

(51) Int. Cl.
*H01M 4/525* (2010.01)
*C01G 53/50* (2025.01)
(Continued)

(52) U.S. Cl.
CPC ............ *H01M 4/525* (2013.01); *C01G 53/50* (2013.01); *H01M 4/131* (2013.01); *H01M 4/364* (2013.01);
(Continued)

(58) Field of Classification Search
CPC ...... H01M 4/525; H01M 4/131; H01M 4/364; H01M 4/366; H01M 4/62; H01M 10/052; C01G 53/50
See application file for complete search history.

(56) References Cited

U.S. PATENT DOCUMENTS 8,486,564 B2 7/2013 Nagai et al.
8,728,666 B2 5/2014 Itou et al.
(Continued)

FOREIGN PATENT DOCUMENTS

CN 101002351 7/2007
CN 101167209 A 4/2008
(Continued)

OTHER PUBLICATIONS

US Office Action dated Feb. 28, 2023, issued in U.S. Appl. No. 17/170,364 (14 pages).
(Continued)

*Primary Examiner* — James Lee
(74) *Attorney, Agent, or Firm* — Womble Bond Dickinson (US) LLP

(57) ABSTRACT

A positive active material for an all-solid-state battery, a method of preparing the same, and an all-solid-state battery including the same. The positive active material includes a secondary particle in which a plurality of primary particles is aggregated and at least a portion of the primary particles is arranged radially, and includes a first boron coating portion on a surface of the secondary particle, and a second boron coating portion on a surface of the primary particles inside the secondary particle.

21 Claims, 13 Drawing Sheets

(51) Int. Cl.

| | |
|---|---|
| ***H01M 4/131*** | (2010.01) |
| ***H01M 4/36*** | (2006.01) |
| ***H01M 4/62*** | (2006.01) |
| ***H01M 10/052*** | (2010.01) |

(52) U.S. Cl.

CPC ............ *H01M 4/366* (2013.01); *H01M 4/62* (2013.01); *H01M 10/052* (2013.01)

(56) References Cited

U.S. PATENT DOCUMENTS

| | | | |
|---|---|---|---|
| 9,337,487 | B2 | 5/2016 | Sun et al. |
| 9,450,229 | B2 | 9/2016 | Uwai et al. |
| 9,559,351 | B2 | 1/2017 | Mori et al. |
| 9,577,254 | B2 | 2/2017 | Nagai |
| 9,601,770 | B2 | 3/2017 | Park et al. |
| 9,899,674 | B2 | 2/2018 | Hirai et al. |
| 10,020,507 | B2 | 7/2018 | Kobayashi et al. |
| 10,396,356 | B2 | 8/2019 | Toya et al. |
| 10,833,329 | B2 | 11/2020 | Kim et al. |
| 2007/0292764 | A1 | 12/2007 | Soma et al. |
| 2009/0029253 | A1 | 1/2009 | Itou et al. |
| 2012/0217435 | A1 | 8/2012 | Yamamoto et al. |
| 2012/0231322 | A1 | 9/2012 | Chu et al. |
| 2013/0045421 | A1 | 2/2013 | Kobino et al. |
| 2014/0087265 | A1 | 3/2014 | Yura et al. |
| 2014/0205898 | A1 | 7/2014 | Lee et al. |
| 2014/0335417 | A1 | 11/2014 | Nagai |
| 2015/0064557 | A1 | 3/2015 | Kim et al. |
| 2015/0086787 | A1 | 3/2015 | Yura et al. |
| 2015/0093580 | A1 | 4/2015 | Kobayashi et al. |
| 2015/0325844 | A1 | 11/2015 | Inoue |
| 2016/0036041 | A1 | 2/2016 | Uwai et al. |
| 2016/0049647 | A1 | 2/2016 | Park et al. |
| 2016/0079597 | A1 | 3/2016 | Fujiki et al. |
| 2016/0181597 | A1 | 6/2016 | Kim et al. |
| 2016/0190573 | A1 | 6/2016 | Sun et al. |
| 2016/0351899 | A1* | 12/2016 | Iwasaki ................ H01M 4/366 |
| 2017/0207453 | A1 | 7/2017 | Oda |
| 2017/0222221 | A1 | 8/2017 | Park et al. |
| 2017/0352885 | A1 | 12/2017 | Kondo et al. |
| 2018/0026267 | A1 | 1/2018 | Kim et al. |
| 2018/0026268 | A1 | 1/2018 | Kim et al. |
| 2018/0047979 | A1 | 2/2018 | Iwasaki |
| 2018/0108940 | A1 | 4/2018 | Kwon et al. |
| 2018/0166687 | A1 | 6/2018 | Chang et al. |
| 2018/0212237 | A1 | 7/2018 | Lee et al. |
| 2018/0219216 | A1 | 8/2018 | Choi et al. |
| 2019/0148721 | A1 | 5/2019 | Park et al. |
| 2019/0173076 | A1 | 6/2019 | Kim et al. |
| 2019/0190018 | A1 | 6/2019 | Aoki et al. |
| 2019/0260024 | A1 | 8/2019 | Nakamura et al. |
| 2019/0386299 | A1 | 12/2019 | Tochio et al. |
| 2020/0028168 | A1 | 1/2020 | Ju et al. |
| 2020/0185709 | A1 | 6/2020 | Zhou et al. |
| 2020/0185714 | A1 | 6/2020 | Han et al. |
| 2020/0313180 | A1 | 10/2020 | Ryoshi et al. |
| 2020/0350582 | A1 | 11/2020 | Kim et al. |
| 2020/0358094 | A1 | 11/2020 | Oshita et al. |
| 2021/0083287 | A1 | 3/2021 | Ahn et al. |
| 2021/0135212 | A1 | 5/2021 | Choi et al. |
| 2021/0135215 | A1 | 5/2021 | Kil |
| 2021/0143413 | A1 | 5/2021 | Lee |
| 2021/0167379 | A1 | 6/2021 | Kim et al. |
| 2021/0265628 | A1 | 8/2021 | Kim et al. |
| 2022/0069301 | A1 | 3/2022 | Yun |
| 2022/0149354 | A1 | 5/2022 | Omura et al. |
| 2022/0255072 | A1 | 8/2022 | Yun et al. |
| 2022/0271283 | A1 | 8/2022 | Sun et al. |
| 2022/0388852 | A1 | 12/2022 | Nam et al. |

FOREIGN PATENT DOCUMENTS

| | | | |
|---|---|---|---|
| CN | 102576873 | A | 7/2012 |
| CN | 104303345 | A | 1/2015 |
| CN | 104521039 | | 4/2015 |
| CN | 105051952 | A | 11/2015 |
| CN | 105070896 | A | 11/2015 |
| CN | 105453311 | | 3/2016 |
| CN | 106207107 | A | 12/2016 |
| CN | 108155357 | A | 6/2018 |
| CN | 109244390 | A | 1/2019 |
| CN | 109643800 | A | 4/2019 |
| CN | 110713215 | A | 1/2020 |
| CN | 112751018 | A | 5/2021 |
| CN | 112751025 | A | 5/2021 |
| EP | 2485305 | A1 | 8/2012 |
| EP | 2882013 | A1 | 6/2015 |
| EP | 2975680 | A1 | 1/2016 |
| EP | 3272710 | A1 | 1/2018 |
| EP | 3734720 | A1 | 11/2020 |
| JP | 2001-243951 | | 9/2001 |
| JP | 2008-251434 | A | 10/2008 |
| JP | 2012-254889 | A | 12/2012 |
| JP | 2013-118156 | A | 6/2013 |
| JP | 2013-206556 | A | 10/2013 |
| JP | 2014-67645 | A | 4/2014 |
| JP | 2015-72800 | A | 4/2015 |
| JP | 2015-76397 | | 4/2015 |
| JP | 2016-004703 | A | 1/2016 |
| JP | 2016-127004 | A | 7/2016 |
| JP | 2018-14325 | A | 1/2018 |
| JP | 2020-74264 | A | 5/2020 |
| JP | 6705068 | B1 | 6/2020 |
| JP | 2020-102432 | A | 7/2020 |
| JP | 2021-77643 | A | 5/2021 |
| KR | 10-2009-0126962 | | 12/2009 |
| KR | 10-2010-0099337 | | 9/2010 |
| KR | 10-2012-0103263 | A | 9/2012 |
| KR | 10-2014-0093529 | | 7/2014 |
| KR | 10-2015-0016125 | | 2/2015 |
| KR | 10-2015-0026863 | A | 3/2015 |
| KR | 10-2015-0090963 | A | 8/2015 |
| KR | 10-2015-0119876 | A | 10/2015 |
| KR | 10-2015-0122172 | A | 10/2015 |
| KR | 10-2016-0032664 | A | 3/2016 |
| KR | 10-2016-0041039 | | 4/2016 |
| KR | 10-2016-0049995 | A | 5/2016 |
| KR | 10-2017-0096673 | A | 8/2017 |
| KR | 10-2017-0103699 | A | 9/2017 |
| KR | 10-2018-0010122 | | 1/2018 |
| KR | 10-1886514 | B1 | 8/2018 |
| KR | 10-2019-0032248 | A | 3/2019 |
| KR | 10-2019-0065963 | A | 6/2019 |
| KR | 10-2019-0078498 | A | 7/2019 |
| KR | 10-2020-0019571 | A | 2/2020 |
| KR | 10-2020-0033354 | A | 3/2020 |
| KR | 10-2020-0044448 | A | 4/2020 |
| KR | 10-2020-0070649 | A | 6/2020 |
| KR | 10-2020-0090727 | A | 7/2020 |
| KR | 10-2021-0007808 | A | 1/2021 |
| WO | WO 2006/010894 | A1 | 2/2006 |
| WO | WO 2011/086690 | A1 | 7/2011 |
| WO | 2012/124256 | A1 | 9/2012 |
| WO | WO 2012/131779 | A1 | 10/2012 |
| WO | WO 2012/131881 | A1 | 10/2012 |
| WO | WO 2014/061399 | A1 | 4/2014 |
| WO | WO 2014/142279 | A1 | 9/2014 |
| WO | WO 2015/108163 | A1 | 7/2015 |
| WO | WO 2016/060451 | A1 | 4/2016 |
| WO | WO 2016/068594 | A1 | 5/2016 |
| WO | WO 2016/175597 | A1 | 11/2016 |
| WO | 2019/039567 | A1 | 2/2019 |
| WO | 2019/147098 | A1 | 8/2019 |
| WO | WO 2020/175506 | A1 | 9/2020 |
| WO | 2021/034020 | A1 | 2/2021 |

OTHER PUBLICATIONS

Japanese Office Action, with English translation, dated Jan. 16, 2023, issued in corresponding Japanese Patent Application No. 2021-205991 (6 pages).

(56) References Cited

OTHER PUBLICATIONS

Chinese Office Action, with English translation, dated Mar. 19, 2020, corresponding to Chinese Patent Application No. 201710595378.4 (16 pages).
Chinese Patent Office Action with English Translation for corresponding Chinese Patent Application No. 20170595368.0, dated Mar. 26, 2020, 25 pages.
Chinese Office Action, with English translation, dated Jul. 3, 2020, issued in corresponding Chinese Patent Application No. 201711293316.4 (18 pages).
Chinese Office Action, with English translation, dated Nov. 4, 2020, issued in Chinese Patent Application No. 201710595378.4 (18 pages).
Chinese Office Action, with English translation, dated Nov. 18, 2020, issued in corresponding Chinese Patent Application No. 201710595368.0 (19 pages).
EPO Extended Search Report dated Nov. 14, 2017, for corresponding European Patent Application No. 17182400.6 (7 pages).
EPO Extended Search Report dated Dec. 4, 2017, for corresponding European Patent Application No. 17182408.9 (9 pages).
EPO Extended Search Report dated Mar. 29, 2018, corresponding to European Patent Application No. 17206091.5 (7 pages).
European Patent Office Action for corresponding European Application No. 17 206 091.5, dated Jun. 18, 2019, 4 pages.
EPO Office Action dated Jun. 23, 2020, issued in European Patent Application No. 17182400.6 (6 pages).
EPO Third Party Observation dated Nov. 26, 2020, issued in corresponding European Patent Application No. 17182400.6 (11 pages).
Japanese Office Action dated Aug. 6, 2018, for corresponding Japanese Patent Application No. 2017-140741 (4 pages).
Japanese Office Action, for Patent Application No. JP 2017-236042, mailed Jan. 11, 2019, 4 pages.
Japanese Office Action dated Aug. 3, 2020, issued in corresponding Japanese Patent Application No. 2017-236042 (5 pages).
Japanese Office Action dated Aug. 31, 2020, issued in corresponding Japanese Patent Application No. 2019-163716 (6 pages).
Japanese Notice of Allowance dated Nov. 24, 2020, issued in Japanese Patent Application No. 2017-236042 (3 pages).
Kim et al., "A New Coating Method for Alleviating Surface Degradation of $LiNi_{0.6}Co_{0.2}Mn_{0.2}O_2$ Cathode Material: Nanoscale Surface Treatment of Primary Particles," Nano Letters, Feb. 2015, pp. 2111-2119, DOI: 10.1021/acs.nanolett.5b00045.
Korean Office Action dated Dec. 9, 2019, corresponding to Korean Patent Application No. 10-2017-0167526 (98 pages).
Lim et al., "Advanced Concentration Gradient Cathode Material with Two-Slope for High-Energy and Safe Lithium Batteries," Advanced Functional Materials, 2015, vol. 25, pp. 4673-4680.
Noh et al., "Cathode Material with Nanorod Structure—An Application for Advanced High-Energy and Safe Lithium Batteries," Chemistry of Materials, May 2013, vol. 25, pp. 2109-2115.
U.S. Office Action dated Mar. 8, 2019, issued in U.S. Appl. No. 15/654,623 (11 pages).
U.S. Final Office Action dated Jun. 21, 2019, issued in U.S. Appl. No. 15/654,623 (10 pages).
U.S. Restriction Requirement dated Sep. 23, 2019, issued in U.S. Appl. No. 15/836,311 (7 pages).
Office Action issued in U.S. Appl. No. 15/836,311 by the USPTO, dated Nov. 29, 2019, 9 pages.
Office Action issued in U.S. Appl. No. 15/654,623 by the USPTO, dated Feb. 12, 2020, 15 pages.
U.S. Final Office Action dated Jun. 12, 2020, issued in U.S. Appl. No. 15/836,311 (9 pages).
U.S. Final Office Action dated Aug. 6, 2020, issued in U.S. Appl. No. 15/654,623 (17 pages).
U.S. Notice of Allowance dated Aug. 26, 2020, issued in U.S. Appl. No. 15/836,311 (9 pages).
U.S. Advisory Action dated Oct. 13, 2020, issued in U.S. Appl. No. 15/654,623 (7 pages).
U.S. Notice of Allowance dated Dec. 3, 2020, issued in U.S. Appl. No. 15/836,311 (8 pages).
U.S. Office Action dated Mar. 12, 2021, issued in U.S. Appl. No. 15/836,311 (13 pages).
U.S. Office Action dated Apr. 2, 2021, issued in U.S. Appl. No. 15/654,623 (15 pages).
Zheng, Zhuo et al., "Uniform Ni-rich $LiNi_{0.6}Co_{0.2}Mn_{0.2}O_2$ Porous Microspheres: Facile Designed Synthesis and Their Improved Electrocheminal Performance," Electrochimica Acta, vol. 191, 2016, pp. 401-410.
U.S. Notice of Allowance dated Jun. 24, 2021, issued in U.S. Appl. No. 15/836,311 (8 pages).
Japanese Office Action dated Jul. 5, 2021, issued in corresponding Japanese Patent Application No. 2019-163717 (6 pages).
U.S. Notice of Allowance dated Apr. 28, 2021, issued in U.S. Appl. No. 15/654,648 (8 pages).
Yan, Pengfei, et al., "Tailoring of Grain Boundary Structure and Chemistry of Cathode Particles for Enhanced Cycle Stability of Lithium Ion Battery," 2018, 22 pages.
Lee, Yongho, et al., "Facile formation of a Li3PO4 coating layer during synthesis of a lithium-rich layered oxide for high-capacity lithium ion batteries," Journal of Power Sources, vol. 315, 2016, pp. 284-293.
U.S. Notice of Allowance dated Aug. 6, 2021, issued in U.S. Appl. No. 15/654,648 (8 pages).
U.S. Notice of Allowance dated Aug. 24, 2021, issued in U.S. Appl. No. 15/836,311 (8 pages).
U.S. Final Office Action dated Oct. 4, 2021, issued in U.S. Appl. No. 15/654,623 (16 pages).
Korean Office Action, for Patent Application No. 10-2020-0142522, mailed Feb. 3, 2022, 8 pages.
U.S. Advisory Action from U.S. Appl. No. 15/654,623, dated Jan. 27, 2022, 4 pages.
U.S. Restriction Requirement from U.S. Appl. No. 15/654,623, dated Jan. 4, 2019, 8 pages.
U.S. Restriction Requirement from U.S. Appl. No. 15/654,648, dated Feb. 25, 2019, 7 pages.
Office action from USPTO for U.S. Appl. No. 15/654,623, mailed Mar. 24, 2022, 15 pages.
European Search Report for EP Application No. 21210044.0 dated May 17, 2022, 8 pages.
Notice of Allowance for U.S. Appl. No. 17/183,295 dated May 20, 2022, 11 pages.
Office Action for U.S. Appl. No. 17/308,940 dated Jul. 8, 2022, 17 pages.
Park, Kang-Joon et al. "Improved Cycling Stability of $Li[Ni_{0.90}Co_{0.05}Mn_{0.05}]O_2$ Through Microstructure Modification by Boron Doping for Li-Ion Batteries," Advanced Energy Materials, 2018, 9 pages.
US Office Action dated Dec. 15, 2023, issued in U.S. Appl. No. 17/170,364 (11 pages).
Espacenet machine translation of CN 109244390A (Year: 2019).
US Final Office Action dated Nov. 30, 2023, issued in U.S. Appl. No. 18/158,274 (11 pages).
US Final Office Action dated Sep. 7, 2023, issued in U.S. Appl. No. 17/170,364 (13 pages).
US Final Office Action dated Jan. 30, 2023, issued in U.S. Appl. No. 17/308,940 (10 pages).
US Restriction Requirement dated Sep. 14, 2022, issued in U.S. Appl. No. 17/170,364 (6 pages).
US Notice of Allowance dated Sep. 21, 2022, issued in U.S. Appl. No. 15/654,623 (8 pages).
Xu-Dong Zhang, et al., "An effective $LiBO_2$ coating to ameliorate the cathode/electrolyte interfacial issues of $LiNi_{0.6}Co_{0.2}Mn_{0.2}O_2$ in solid-state Li batteries", *Journal of Power Sources*, 426 (2019) 242-249.
US Notice of Allowance dated Dec. 6, 2021, issued in U.S. Appl. No. 15/654,648 (8 pages).
US Notice of Allowance dated Dec. 9, 2021, issued in U.S. Appl. No. 15/836,311 (8 pages).
US Office Action dated Jun. 21, 2023, issued in U.S. Appl. No. 18/158,274 (10 pages).

(56) References Cited

OTHER PUBLICATIONS

US Office Action dated Mar. 27, 2024, issued in U.S. Appl. No. 17/170,364 (15 pages).
US Office Action dated Apr. 23, 2024, issued in U.S. Appl. No. 18/158,274 (11 pages).
US Office Action dated Aug. 28, 2024, issued in U.S. Appl. No. 18/158,274 (11 pages).
US Office Action dated Oct. 15, 2024, issued in U.S. Appl. No. 17/170,364 (13 pages).
US Office Action dated Mar. 21, 2025, issued in U.S. Appl. No. 17/170,364 (12 pages).
US Office Action dated Apr. 29, 2025, issued in U.S. Appl. No. 18/158,274 (11 pages).
US Office Action dated Jun. 2, 2025, issued in U.S. Appl. No. 18/316,175 (10 pages).
European Office Action corresponding to EP Application No. 17182408.9, dated Jul. 17, 2025 (4 pages).
Chinese Office Action corresponding to CN Application No. 202111405661.9, dated Jul. 29, 2025 (8 pages).
US Office Action dated Aug. 25, 2025, issued in U.S. Appl. No. 17/521,709 (10 pages).
European Office Action corresponding to EP Application No. 17182400.6 , dated Sep. 25, 2025 (6 pages).
US Office Action dated Oct. 24, 2025, issued in U.S. Appl. No. 17/170,364 (13 pages).
US Final Office Action dated Dec. 8, 2025, issued in U.S. Appl. No. 18/316,175 (7 pages).
Korean Office Action dated Nov. 7, 2025, issued in Korean Patent Application No. 10-2021-0097217 (5 pages).
Korean Office Action dated Mar. 19, 2026, issued in corresponding Korean Patent Application No. 10-2021-0097217 (5 pages).
Wang, Xi-min, et al., "Synthesis and Characteristics of Layered LiNi0.8Co0.1Mn0.1O2 Cathode Material for Lithium Rechargeable Batteries," The Chinese Journal of Process Engineering, vol. 7, No. 4, Aug. 2007, with English Abstract, 5 pages.
Chinese Notice of Allowance, with English translation, dated Mar. 9, 2026, issued in corresponding Chinese Patent Application No. 202111405661.9 (7 pages).
US Final Office Action dated Mar. 27, 2026, issued in U.S. Appl. No. 17/170,364 (17 pages).
US Notice of Allowance dated May 1, 2026, issued in U.S. Appl. No. 18/316,175 (8 pages).
US Notice of Allowance dated May 2, 2026, issued in U.S. Appl. No. 18/158,274 (8 pages).

* cited by examiner

POSITIVE ACTIVE MATERIAL FOR AN ALL-SOLID-STATE BATTERY, METHOD OF PREPARING THE SAME, AND ALL-SOLID-STATE BATTERY

CROSS-REFERENCE TO RELATED APPLICATION

This application is a continuation-in-part of U.S. patent application Ser. No. 15/654,648, filed in the United States Patent and Trademark Office on Jul. 19, 2017, and is related to co-pending application Ser. No. 17/308,940, filed in the United States Patent and Trademark Office on May 5, 2021, which is a continuation of application Ser. No. 15/654,648, the entire content of each of which is incorporated herein by reference. U.S. patent application Ser. No. 15/654,648 claims priority to and the benefit of Korean Patent Application No. 10-2016-0092243, filed in the Korean Intellectual Property Office on Jul. 20, 2016, and Korean Patent Application No. 10-2016-162291, filed in the Korean Intellectual Property Office on Nov. 30, 2016, the entire content of each of which is incorporated herein by reference. This application also claims priority to and the benefit of Korean Patent Application No. 10-2021-0097217, filed in the Korean Intellectual Property Office on Jul. 23, 2021, the entire content of which is incorporated herein by reference.

BACKGROUND

1. Field

One or more aspects of embodiments of the present disclosure relate to a positive active material for an all-solid-state battery, a method of preparing the same, and an all-solid-state battery.

2. Description of the Related Art

Portable information devices (such as a cell phone, a laptop, smart phone, and/or the like) and electric vehicles use a rechargeable lithium battery having high energy density and easy portability as a driving power source. Recent research has been conducted on rechargeable lithium batteries with high energy density as a driving power source for hybrid or electric vehicles.

An all-solid-state battery among rechargeable lithium batteries refers to a battery in which all materials (e.g., components) are solid, and in particular, to a battery utilizing a solid electrolyte. An all-solid-state battery should be safe with no risk of explosion due to leakage of the electrolyte, and should also be easily manufactured into a thin battery.

Recently, various positive active materials that may be applied to this all-solid-state battery are being studied. Lithium nickel oxide, lithium nickel manganese cobalt composite oxide, lithium nickel cobalt aluminum composite oxide, lithium cobalt oxide, and/or the like, which have been used in the related art, have has limited performance in studies of all-solid-state batteries. Accordingly, development of a new positive active material is required to realize an all-solid-state battery securing long-term cycle-life characteristics as well as realizing high capacity and a high energy density.

SUMMARY

One or more aspects of embodiments of the present disclosure are directed toward a positive active material for an all-solid-state battery with improved cycle-life characteristics while implementing a high capacity, a preparing method thereof, and an all-solid-state battery including the same.

One or more embodiments of the present disclosure provide a positive active material for an all-solid-state battery including a lithium nickel-based composite oxide, wherein the positive active material includes secondary particles in which a plurality of primary particles is aggregated, and at least a portion of the primary particles is arranged radially, a first boron coating portion on a surface of the secondary particles, and a second boron coating portion on a surface of the primary particles inside (e.g., in an interior portion) of the secondary particles.

The first boron coating portion and the second boron coating portion may each independently include boron oxide, lithium borate, or a combination thereof.

A weight of the first boron coating portion may be greater than a weight of the second boron coating portion.

The first boron coating portion may be included in an amount of about 70 wt % to about 98 wt %, and the second boron coating portion may be included in an amount of about 2 wt % to about 30 wt % based on the total amount of the first boron coating portion and the second boron coating portion.

A content (e.g., amount) of the first boron coating portion may be about 0.02 wt % to about 0.3 wt % based on the positive active material.

A content (e.g., amount) of the second boron coating portion may be about 0.001 wt % to about 0.05 wt % based on the positive active material.

A total amount of the first boron coating portion and the second boron coating portion may be about 0.1 mol % to about 3 mol %, or about 0.1 mol % to about 1.5 mol %, based on the positive active material.

The primary particles may have a plate shape, and the at least portion of the primary particles may have a long axis arranged in a radial direction.

An average length of the plate-shaped primary particles may be about 150 nm to about 500 nm, an average thickness of the plate-shaped primary particles may be about 100 nm to about 200 nm, and a ratio of the average thickness to the average length may be about 1:2 to about 1:5.

The secondary particles may include an inner portion including an irregular porous structure and an outer portion including a radially arranged structure.

The inner portion of a secondary particle (e.g., of the secondary particles) may have a larger average pore size than the outer portion, the average pore size in the inner portion of the secondary particle may be about 150 nm to about 1 μm, and the average pore size in the outer portion of the secondary particle may be less than about 150 nm.

The secondary particles may include open pores having an average pore size of less than about 150 nm on the surface, facing toward the center of the inner portion (e.g., as measured from the surface toward the center of the inner portion).

The lithium nickel-based composite oxide may be represented by Chemical Formula 1.

$$Li_{a1}Ni_{x1}M^1_{y1}M^2_{1-x1-y1}O_2. \quad \text{[Chemical Formula 1]}$$

In Chemical Formula 1, $0.9 \le a1 \le 1.8$, $0.3 \le x1 \le 1$, $0 \le y1 \le 0.7$, $M^1$ and $M^2$ may each independently be selected from aluminum (Al), boron (B), barium (Ba), calcium (Ca), cerium (Ce), cobalt (Co), chromium (Cr), copper (Cu), fluorine (F), iron (Fe), magnesium (Mg), manganese (Mn), molybdenum (Mo), niobium (Nb), phosphorus (P), sulfur(S), silicon (Si), strontium (Sr), titanium (Ti), vanadium (V), tungsten (W), zirconium (Zr), and combinations thereof.

One or more embodiments of the present disclosure provide a method of preparing a positive active material for an all-solid-state battery, the method including mixing a lithium raw material, a nickel-based hydroxide, and a boron raw material and heat-treating the resultant (e.g., to obtain the above-described positive active material).

A content (e.g., amount) of the boron raw material may be about 0.1 mol % to about 3 mol % based on 100 mol % of the nickel-based hydroxide.

The heat-treating may be performed at a temperature of about 650° C. to about 850° C. for about 5 hours to about 20 hours.

One or more embodiments of the present disclosure provide an all-solid-state battery including a positive electrode including the positive active material, a negative electrode, and a solid electrolyte (e.g., solid electrolyte layer) between the positive electrode and the negative electrode.

The positive active material for an all-solid-state battery according to an embodiment and an all-solid-state battery including the same may exhibit excellent or suitable cycle-life characteristics while realizing high capacity and/or high energy density.

DETAILED DESCRIPTION

Figure 1:
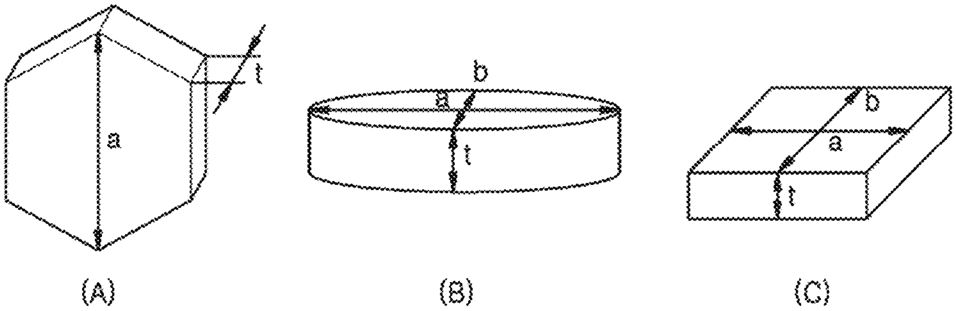
FIG. 1 is a schematic view showing the shape of a plate-shaped primary particle according to an embodiment.

Hereinafter, specific embodiments will be described in more detail so that those of ordinary skill in the art can easily implement them. However, this disclosure may be embodied in many different forms and should not be construed as limited to the example embodiments set forth herein.

The terminology used herein is used to describe embodiments only, and is not intended to limit the present disclosure. Singular forms such as "a," "an," and "the" are intended to include the plural forms as well, unless the context clearly indicates otherwise.

As used herein, the term "combination thereof" may refer to a mixture, laminate, composite, copolymer, alloy, blend, reaction product, and/or the like of the listed constituents.

Herein, it should be understood that terms such as "comprises," "includes," or "have" are intended to designate the presence of an embodied feature, number, step, element, or combinations thereof, but do not preclude the possibility of the presence or addition of one or more other features, numbers, steps, elements, or combinations thereof.

In the drawings, the thicknesses of layers, films, panels, regions, etc., may be exaggerated for clarity, and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the terms "use," "using," and "used" may be considered synonymous with the terms "utilize," "utilizing," and "utilized," respectively. As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items.

The term "may" will be understood to refer to "one or more embodiments," some of which include the described element and some of which exclude that element and/or include an alternate element. Similarly, alternative language such as "or" refers to "one or more embodiments," each including a corresponding listed item.

The term "layer" used herein includes not only a shape or element formed on the whole (e.g., entire) surface when viewed from a plan view, but also a shape formed on a partial surface (e.g., formed to cover only a part of the surface).

The term "average particle diameter" as referred to herein may be measured by a method well known to those skilled in the art, for example, may be measured by a particle size analyzer, or may be measured by a transmission electron micrograph or a scanning electron micrograph. In some embodiments, it is possible to obtain an average particle diameter value by utilizing a dynamic light scattering method, performing data analysis, counting the number of particles for each particle size range, and calculating from this. Unless otherwise defined, the average particle diameter may refer to the diameter (D50) of particles having a cumulative volume of 50 volume % in the particle size distribution.

Positive Active Material

An embodiment provides a positive active material for an all-solid-state battery including a lithium nickel-based composite oxide, wherein the positive active material includes secondary particles in which a plurality of primary particles is aggregated and at least a portion of the primary particles is arranged radially, a first boron coating portion on a surface of the secondary particles, and a second boron coating portion on a surface of the primary particles inside the secondary particles.

An all-solid-state battery has a problem of not properly expressing capacity (e.g., not being cycled through its full capacity) due to high resistance occurring at the interface between the positive active material and the solid electrolyte. The reason are that an impurity layer (e.g., a layer formed of impurities) is formed by a chemical reaction (e.g., side reactions) of the positive active material and the solid electrolyte, and/or a space charge layer is formed according to a contact of (e.g., along the interface of) the solid active material with the solid electrolyte. In order to solve this problem, technology of forming a buffer layer having lithium ion conductivity at the interface between the positive active material and the solid electrolyte has been developed. However, a sol-gel method utilizing an organic solvent, a spray drying method, an atomic layer deposition method, and/or the like is utilized in order to form the buffer layer, but incurs an excessive process cost and thus has a limit to practical application to mass production.

The positive active material according to an embodiment is coated with a lithium boron composite and/or the like on the surface (e.g. outermost surface) of the secondary particles and at (e.g., along) the inner grain boundaries without a separate process of forming the buffer layer, thereby suppressing interface resistance between the positive active material and the solid electrolyte and realizing high capacity.

Because the lithium boron composite and/or the like are coated at the inner grain boundaries as well as on the (outer) surface of the secondary particles, the positive active material maintains the buffer layer despite the volume changes associated with charges and discharges, thereby realizing long-term cycle-life characteristics.

The positive active material includes a first boron coating portion on the surface of the secondary particles and a second boron coating portion on the surface of the primary particles in the inner portion of the secondary particles. The first boron coating portion and the second boron coating portion each include a boron compound.

The boron compound may include, for example boron oxide, lithium borate, or a combination thereof, for example $B_2O_2$, $B_2O_3$, $B_4O_3$, $B_4O_5$, $LiBO_2$, $Li_2B_4O_7$, $LisBO_3$, or combinations thereof.

The second boron coating portion is present in the inner (e.g., interior) portion rather than the surface of the secondary particle, and is coated along interfaces of (e.g., along or between) the primary particles in the inner portion of the secondary particle, and thus it may be expressed as being coated at the grain boundary. Here, the term "inner portion of the secondary particles" refers to the entire interior (e.g., of the secondary particles) except for the surface, and for example, may refer to the entire interior starting from a depth of approximately 2 μm from the outer surface. It can also be conceptualized as of the portion inaccessible to distilled water when the secondary particles of the positive active material are washed with distilled water.

A related art method of coating boron on a positive active material is to mix a boron raw material with a lithium metal composite oxide in a wet or dry method and then, heat-treat them. However, the boron may contribute to resistance on the surface of the positive active material and thus deteriorate capacity and cycle-life. In contrast, according to an embodiment, a method of injecting the boron raw material along with a lithium source into a precursor in which primary particles are radially oriented and then, heat-treating the materials may be utilized to provide a positive active material coated with boron at the inner grain boundaries as well as on the secondary particle surface. Because the boron is coated at the inner grain boundaries and concurrently (e.g., simultaneously) on the surface of the positive active material in an appropriate or suitable amount, the boron may no longer contribute to resistance but may secure structural stability of the positive active material, and buildup of interface resistance between the positive active material and the solid electrolyte is suppressed or reduced, improving capacity characteristics and long-term cycle-life characteristics of a battery.

According to an embodiment, the weight (e.g., amount) of the first boron coating portion may be greater than the weight (e.g., amount) of the second boron coating portion. For example, based on the total amount of the first boron coating portion and the second boron coating portion, the second boron coating portion may be included in an amount of about 2 wt % to about 30 wt %, specifically about 3 wt % to about 25 wt %, or about 5 wt % to about 20 wt %, and the first boron coating portion may be included in an amount of about 70 wt % to about 98 wt %, about 75 wt % to about 97 wt %, or about 80 wt % to about 95 wt %. For example, the weight ratio of the first boron coating portion and the second boron coating portion may be about 70:30 to about 98:2, for example, about 70:30 to about 97:3, or about 75:25 to about 95:5. When the content (e.g., amount) ratio of the first boron coating portion and the second boron coating portion is as described, boron may not substantially contribute to resistance in the positive active material and may instead serve to improve performance, and the positive active material including such a boron coating portion may exhibit improved cycle-life characteristics while implementing a high capacity.

The content (e.g., amount) of the first boron coating portion may be, for example, about 0.02 wt % to about 0.3 wt %, about 0.03 wt % to about 0.3 wt %, about 0.04 wt % to about 0.2 wt %, or about 0.05 wt % to about 0.1 wt % based on the total weight of the positive active material. The content (e.g., amount) of the second boron coating portion may be, for example, about 0.001 wt % to about 0.05 wt %, about 0.001 wt % to about 0.04 wt %, about 0.002 wt % to about 0.03 wt %, or about 0.003 wt % to about 0.02 wt % based on the positive active material, but is not limited thereto. When the contents of the first boron coating portion and the second boron coating portion based on the positive active material is as described above, boron may not substantially contribute to resistance in the positive active material, and the positive active material including the same may exhibit high capacity and excellent or suitable cycle-life characteristics.

A total amount of the first boron coating portion and the second boron coating portion may be about 0.1 mol % to about 3 mol %, for example about 0.1 mol % to about 2.5 mol %, about 0.1 mol % to about 2 mol %, about 0.1 mol % to about 1.5 mol %, about 0.1 mol % to about 1.3 mol %, or about 0.5 mol % to about 1.3 mol % based on 100 mol % of the positive active material. When the total amount of the first boron coating portion and the second boron coating portion is outside of a set or predetermined content (e.g., the above-described amount), the initial discharge capacity may decrease and cycle-life characteristics may be deteriorated. When the content (e.g., amount) of the first boron coating on the surface of the secondary particles is excessive, the initial discharge capacity of an all-solid-state battery may be greatly reduced as boron acts as a resistance.

The positive active material according to embodiments of the present disclosure may include secondary particles in which at least two or more primary particles are aggregated, and at least a portion of the primary particles have a radially arranged structure. At least some of the primary particles may have a plate shape. The primary particles may have a thickness that is smaller than a corresponding long axis length. Here, the term "long axis length" refers to the maximum length along the widest surface of the primary particle. For example, the primary particle may have a structure in which the length (t) in one axial direction (i.e., thickness direction) is smaller than the long axis length (a) in the other direction (i.e., plane direction).

FIG. 1 is a schematic view showing example plate shapes of primary particles of a positive active material. Referring to FIG. 1, the primary particles according to an embodiment have one or more suitable detailed shapes while having a basic plate structure, for example, (A) a polygonal nanoplate shape (such as a hexagon), (B) a nanodisk shape, and (C) a rectangular parallelepiped shape. In FIG. 1, "a" refers to the length of the long axis of the primary particle, "b" refers to the length of the short axis, and "t" refers to the thickness. The thickness t of the primary particles may be smaller than the lengths a and b in the plane direction. Among the lengths in the plane direction, a may be longer or equal to b. A direction in which the thickness t is defined in the primary particles is defined as a thickness direction, and lengths a and b form a plane and are defined as plane directions.

Figure 2:
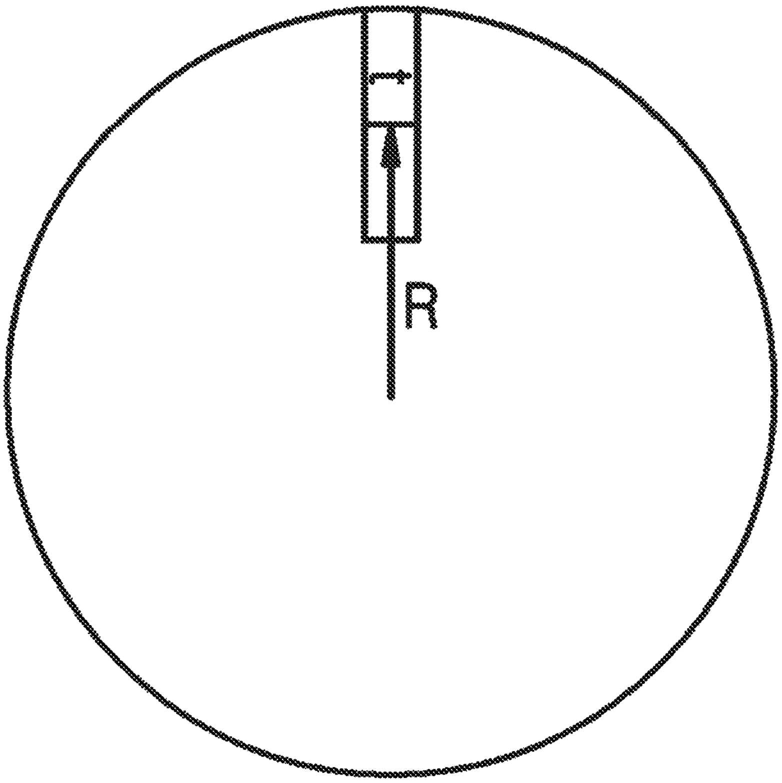
FIG. 2 is a view for explaining the definition of a radial in secondary particles according to an embodiment.

In the positive active material, at least a portion of the primary particles may have a radially arranged structure, and for example, long axes of the primary particles may be arranged in a radial direction. FIG. 2 is a view for explaining the definition of "a radial direction" in secondary particles according to an embodiment. In an embodiment, the term "radially arranged structure" refers to that, as shown in FIG. 2, the thickness (t) direction of the primary particles is perpendicular (e.g., normal) to or within an angle of about ±5° of perpendicular to the direction (R) toward the surface from the center of the secondary particles.

At least one part of the primary particles may be oriented radially. For example, all or some of the primary particles in a secondary particle may be radially oriented. For example, the secondary particle may include an outer portion and an inner portion, and the primary particles both in the outer portion and the inner portion may be radially oriented (e.g., simultaneously), or only the primary particles in the outer portion may be radially oriented. As another example, the secondary particle may include an outer portion in which the primary particles are oriented radially and an inner portion in which the primary particles are irregularly arranged.

The average length of the primary particles of the secondary particle may be about 0.01 μm to about 5 μm, for example about 0.01 μm to about 2 μm, about 0.01 μm to about 1 μm, about 0.02 μm to about 1 μm, about 0.05 μm to about 0.5 μm, or about 150 nm to about 500 nm. Here, "average length" refers to the average length of the long axis length (a) in the plane direction when the primary particles are plate-shaped, and when the primary particle is spherical, it refers to the average particle diameter.

When the primary particles are plate-shaped, an average thickness of the primary particles may be, for example, greater than or equal to about 50 nm, greater than or equal to about 100 nm, greater than or equal to about 200 nm, greater than or equal to about 300 nm, greater than or equal to about 400 nm, greater than or equal to about 500 nm, greater than or equal to about 600 nm, greater than or equal to about 700 nm, greater than or equal to about 800 nm, or greater than or equal to about 900 nm, and for example less than or equal to about 5 μm, less than or equal to about 4 μm, less than or equal to about 3 μm, less than or equal to about 2 μm, less than or equal to about 1 μm, less than or equal to about 900 nm, less than or equal to about 800 nm, less than or equal to about 700 nm, less than or equal to about 600 nm, or less than or equal to about 500 nm, for example about 100 nm to about 200 nm. In some embodiments, in the primary particle, a ratio of the average thickness to the average length may be about 1:1 to about 1:10, for example about 1:1 to about 1:8, about 1:1 to about 1:6, or about 1:2 to about 1:5.

As described above, when the average length, the average thickness, and the ratio between the average thickness and the average length of the primary particles satisfy the above ranges and the primary particles are radially arranged, it is possible to have a relatively large number of lithium diffusion pathways between grain boundaries on the surface side, and a large number of crystal planes capable of lithium transfer are exposed to the outside, so that lithium diffusion is improved and high initial efficiency and/or capacity can be secured. When the primary particles are arranged radially, the pores exposed on (e.g., at) the surface are directed toward the center of the secondary particles, thereby promoting (e.g., facilitating) diffusion of lithium (e.g., into and out of the particle). Due to the radially arranged primary particles, substantially uniform contraction and expansion may be possible when lithium is deintercalated and/or intercalated, and when lithium is deintercalated, the pores existing in the (001) direction (which is the direction in which the particles expand) may act as a buffer. In some embodiments, due to the size and arrangement of the primary particles, the probability of cracks occurring during contraction and expansion of the active material may be lowered, and the inner pores may further alleviate the volume change to reduce the cracks generated between the primary particles during charging and discharging, resulting in improved cycle-life characteristics of an all-solid-state battery and reduced resistance increase phenomenon.

The positive active material may have an irregular porous structure in at least one of the inner portion and the outer portion of the secondary particle. The term "irregular porous structure" may refer to a structure in which the pore sizes, shapes, and arrangement are not regular or uniform. For example, the secondary particles may include an inner portion including an irregular porous structure and an outer portion including a radially arranged structure. For example, the primary particles in the inner portion may be arranged without regularity, unlike the primary particles in the outer portion. The inner portion containing the irregular porous structure includes primary particles like the outer portion.

The term "outer portion" may refer to a region (e.g., of the particle) within about 30 length % to about 50 length % from the outermost surface, for example, within about 40 length % from the outermost surface with respect to the distance from the center to the surface of the secondary particle, or in some embodiments, may refer to a region within about 2 μm from the outermost surface of the secondary particle. The term "inner portion" may refer to a region (e.g., of the particle) within about 50 length % to about 70 length % from the center, for example, within about 60 length % from the center with respect to the distance from the center to the surface of the secondary particle, or in some embodiments, a region excluding the region within about 2 μm from the outermost surface of the secondary particle.

The secondary particles of the positive active material include a radially-oriented exterior structure and an irregular porous interior structure, wherein the interior of the secondary particles may have a larger pore than the exterior. For example, the positive active material may have an inner pore size of about 150 nm to about 1 μm and an outer pore size of less than about 150 nm. When the inner pore size is larger than the outer pore size in this manner, the diffusion distance of lithium in the active material may be advantageously shortened, compared with secondary particles having the same inner and outer pore size, and lithium may be easily inserted from the outside. In addition, there may be an effect of alleviating the volume changes during charge and discharge. Herein, the term "pore size" refers to an average diameter when a pore is spherical or circular, and a length of a major axis when the pore is oval or elliptical.

The secondary particles of the positive active material may have open pores having a size of less than about 150 nm, for example, about 10 nm to about 148 nm, that are open at the surface and extending toward the center of the inner portion. The open pores may be exposed pores into which electrolyte solution may flow in and out. The open pores may be formed to a depth of less than or equal to about 150 nm, for example, about 0.001 nm to about 100 nm, for example, about 1 nm to about 50 nm on average from the surface of the secondary particles.

Closed pores may exist in the inner portion of the secondary particle, and closed pores and/or open pores may exist in the outer portion. The closed pores may exclude or mostly exclude an electrolyte, while the open pores may include an electrolyte therein. The closed pores are independent pores that are not connected to other pores because all of the walls of the pores are formed in a closed structure, while the open pores are substantially continuous pores (e.g., may form a continuous network) connected to the outside of the particle because at least some of the walls of the pores are formed in an open structure.

Figure 3:
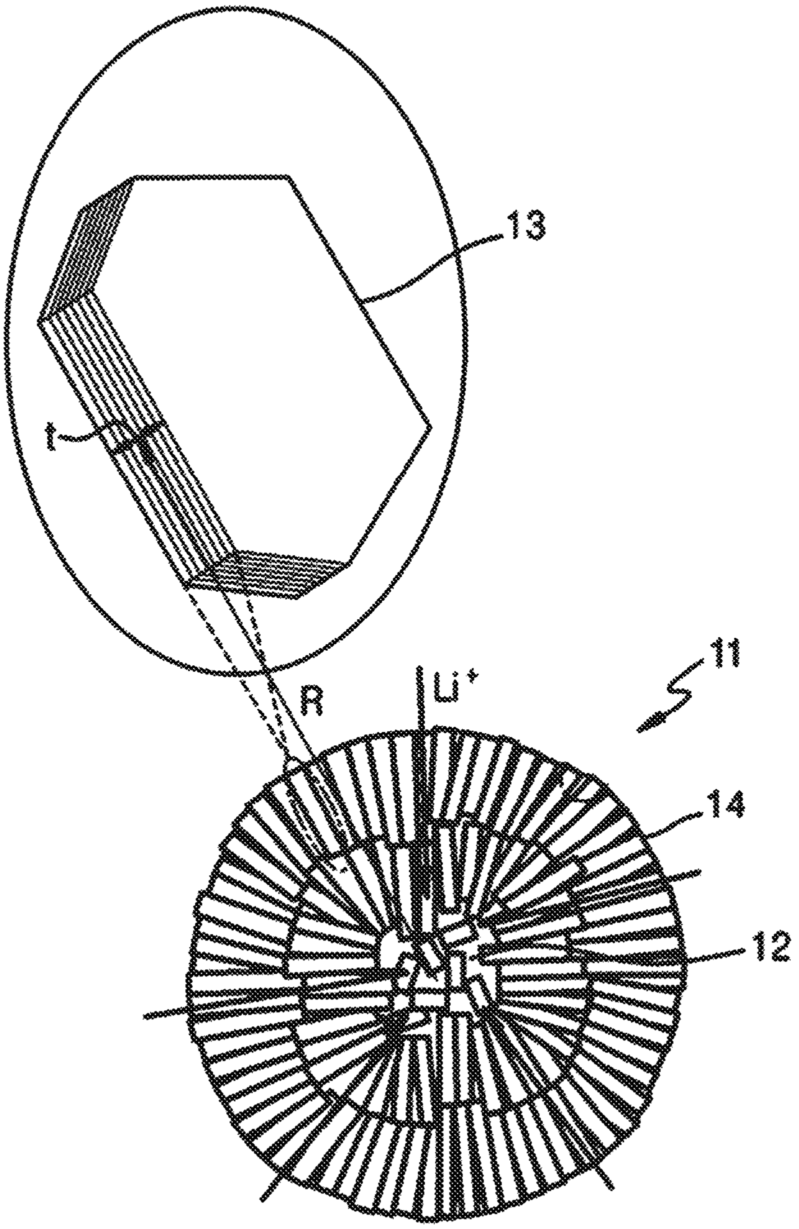
FIG. 3 is a schematic view showing a cross-sectional structure of a secondary particle according to an embodiment.

FIG. 3 is a schematic view illustrating a cross-sectional structure of secondary particles of the positive active material. Referring to FIG. 3, the secondary particles 11 of the positive active material according to an embodiment have an outer portion 14 having a structure in which the primary particles 13 having a plate shape are arranged in a radial direction, and an inner portion 12 in which the primary particles 13 are irregularly arranged. The inner portion 12 may have more empty spaces between the primary particles than the outer portion. In some embodiments, the pore size and porosity in the inner portion are large and irregular compared with the pore size and porosity in the outer portion. In FIG. 3, arrows indicate the movement direction of lithium ions.

In the secondary particle, the inner portion has a porous structure, so that the diffusion distance of lithium ions to the inner portion may be reduced, and the outer portion is radially arranged toward the surface, so that lithium ions may be easily intercalated into the surface. Because the size of the primary particles is small, it is easy to secure a lithium transfer path between crystal grains. In addition, because the size of the primary particles is small and the pores between the primary particles alleviate the volume change occurring during charging and discharging, stress caused by the volume change during charging and discharging may be minimized or reduced. Such a positive active material may reduce resistance in an all-solid-state battery, and improve its capacity characteristics and/or cycle-life characteristics.

In the secondary particles, the plurality of primary particles may have a radial arrangement structure by being arranged toward a "single (1)-center" to make surface contact along the thickness direction of the primary particles. In some embodiments, the secondary particles may have a "multi-center" radial arrangement structure having a plurality of centers. As such, when the secondary particles have a single-center or multi-center radial arrangement structure, lithium is easily deintercalated and/or intercalated to the center of the secondary particles.

The secondary particles may include radial primary particles and non-radial primary particles. The content (e.g., amount) of the non-radial primary particles may be less than or equal to about 20 wt %, for example about 0.01 wt % to about 10 wt %, or about 0.1 wt % to about 5 wt %, based on 100 parts by weight of the total weight of the radial primary particles and the non-radial primary particles. When non-radial primary particles are included in the above-described content (e.g., amount) range in addition to the radial primary particles in the secondary particles, an all-solid-state battery with improved cycle-life characteristics may be provided by facilitating the diffusion of lithium.

The positive active material includes a nickel composite oxide, and may also include a lithium nickel composite oxide. The nickel content (e.g., amount) in the lithium nickel composite oxide may be greater than or equal to about 30 mol %, for example greater than or equal to about 40 mol %, greater than or equal to about 50 mol %, greater than or equal to about 60 mol %, greater than or equal to about 70 mol %, greater than or equal to about 80 mol %, or greater than or equal to about 90 mol % and less than or equal to about 99.9 mol %, or less than or equal to about 99 mol % based on the total amount of metals other than lithium. For example, the nickel content (e.g., amount) in the lithium nickel composite oxide may be higher than the content (e.g., amount) of each of other metals such as cobalt, manganese, and aluminum. When the nickel content (e.g., amount) satisfies the above range, the positive active material may exhibit excellent or suitable battery performance while realizing a high capacity.

The lithium nickel-based composite oxide may be represented by Chemical Formula 1.

$$Li_{a1}Ni_{x1}M^1_{y1}M^2_{1-x1-y1}O_2 \quad \text{[Chemical Formula 1]}$$

In Chemical Formula 1, $0.9 \le a1 \le 1.8$, $0.3 \le x1 \le 1$, $0 \le y1 \le 0.7$, and $M^1$ and $M^2$ may each independently be selected from aluminum (Al), boron (B), barium (Ba), calcium (Ca), cerium (Ce), cobalt (Co), chromium (Cr), copper (Cu), fluorine (F), iron (Fe), magnesium (Mg), manganese (Mn), molybdenum (Mo), niobium (Nb), phosphorus (P), sulfur (S), silicon (Si), strontium (Sr), titanium (Ti), vanadium (V), tungsten (W), zirconium (Zr), and combinations thereof.

In Chemical Formula 1, $0.4 \le x1 \le 1$ and $0 \le y1 \le 0.6$, or $0.5 \le x1 \le 1$ and $0 \le y1 \le 0.5$, or $0.6 \le x1 \le 1$ and $0 \le y1 \le 0.4$, or $0.7 \le x1 \le 1$ and $0 \le y1 \le 0.3$, or $0.8 \le x1 \le 1$ and $0 \le y1 \le 0.2$, or $0.9 \le x1 \le 1$ and $0 \le y1 \le 0.1$.

The lithium nickel-based composite oxide may be, for example, represented by Chemical Formula 2.

$$Li_{a2}Ni_{x2}CO_{y2}M^3_{1-x2-y2}O_2 \quad \text{[Chemical Formula 2]}$$

In Chemical Formula 2, $0.9 \le a2 \le 1.8$, $0.3 \le x2 < 1$, $0 < y2 \le 0.7$, and $M^3$ may be selected from Al, B, Ba, Ca, Ce, Cr, Cu, F, Fe, Mg, Mn, Mo, Nb, P, S, Si, Sr, Ti, V, W, Zr, and combinations thereof.

In Chemical Formula 2, $0.3 \le x2 \le 0.99$ and $0.01 \le y2 \le 0.7$, or $0.4 \le x2 \le 0.99$ and $0.01 \le y2 \le 0.6$, or $0.5 \le x2 \le 0.99$ and $0.01 \le y2 \le 0.5$, or $0.6 \le x2 \le 0.99$ and $0.01 \le y2 \le 0.4$, or $0.7 \le x2 \le 0.99$ and $0.01 \le y2 \le 0.3$, or $0.8 \le x2 \le 0.99$ and $0.01 \le y2 \le 0.2$, or $0.9 \le x2 \le 0.99$ and $0.01 \le y2 \le 0.1$.

The lithium nickel-based composite oxide may be, for example, represented by Chemical Formula 3.

$$Li_{a3}Ni_{x3}CO_{y3}M^4_{z3}M^5_{1-x3-y3-z3}O_2 \quad \text{[Chemical Formula 3]}$$

In Chemical Formula 3, $0.9 \le a3 \le 1.8$, $0.3 \le x3 \le 0.98$, $0.01 \le y3 \le 0.69$, $0.01 \le z3 \le 0.69$, $M^4$ may be selected from Al, Mn, and a combination thereof, and $M^5$ may be selected from B, Ba, Ca, Ce, Cr, Cu, F, Fe, Mg, Mo, Nb, P, S, Si, Sr, Ti, V, W, Zr, and combinations thereof.

In Chemical Formula 3, $0.4 \le x3 \le 0.98$, $0.01 \le y3 \le 0.59$, and $0.01 \le z3 \le 0.59$, or $0.5 \le x3 \le 0.98$, $0.01 \le y3 \le 0.49$, and $0.01 \le z3 \le 0.49$, or $0.6 \le x3 \le 0.98$, $0.01 \le y3 \le 0.39$, and $0.01 \le z3 \le 0.39$, or $0.7 \le x3 \le 0.98$, $0.01 \le y3 \le 0.29$, and $0.01 \le z3 \le 0.29$, or $0.8 \le x3 \le 0.98$, $0.01 \le y3 \le 0.19$, and $0.01 \le z3 \le 0.19$, or $0.9 \le x3 \le 0.98$, $0.01 \le y3 \le 0.09$, and $0.01 \le z3 \le 0.09$.

Generally, as the nickel content (e.g., amount) in the positive active material is increased, battery cycle-life and capacity may be deteriorated due to increased cation mixing (in which $Ni^{2+}$ ions take lithium sites), and/or because diffusion of lithium ions is hindered by impurities such as NiO and/or the like. In addition, the positive active material may participate in side reactions with the electrolyte due to structural collapse and cracks occurring due to charges and discharges, which may decrease the battery cycle-life and bring about a safety problem. When boron is coated only on the surface of an active material to solve these problems in a related art method, the boron contributes to resistance and may sharply decrease capacity and cycle-life. In contrast, in the positive active material according to an embodiment, even when a high nickel-based material is utilized, the active material is coated with boron in appropriate or suitable amounts on the surface and inner grain boundaries and thus may realize high capacity and concurrently (e.g., simultaneously) improved cycle-life characteristics without deteriorated initial discharge capacity.

Method of Preparing Positive Active Material

In an embodiment, a method of preparing a positive active material for an all-solid-state battery includes mixing a lithium raw material, a nickel-based hydroxide, and a boron raw material, and heat-treating the resultant.

When boron is coated on a positive active material in the related art, a lithium raw material is commonly mixed with a nickel transition metal composite hydroxide followed by heat-treating the resultant to prepare a lithium nickel-based composite oxide, and a boron source is mixed therewith by a wet or dry method followed by performing heat-treatment again. In this case, only the surface of the positive active material is coated with boron, and thus boron acts as a resistance, thereby reducing capacity and cycle-life. On the other hand, according to the preparing method according to an embodiment, a positive active material coated with boron not only on the surface of the positive active material but also on grain boundaries inside the positive active material may be obtained.

According to this method, a boron coating portion of the positive active material may function as a kind of buffer layer in an all-solid-state battery, suppress or reduce interfacial resistance of the positive active material with the solid electrolyte, and accordingly, improve capacity characteristics of the all-solid-state battery. Furthermore, because the positive active material is also coated with boron at the inner grain boundaries, compared with related art active materials having a coating layer or a buffer layer on the surface alone, performance of the buffer layer may be maintained despite the volume change of the positive active material during the charge and discharge, accordingly improving long-term cycle-life characteristics of the all-solid-state battery.

In the above manufacturing method, the nickel-based hydroxide may be a nickel transition metal composite hydroxide as a precursor of the positive active material and prepared in a co-precipitation method and/or the like. The nickel-based hydroxide may have a structure in which at least a portion of primary particles are radially oriented. This radially oriented structure may be the same as described.

The nickel-based hydroxide may be, for example, represented by Chemical Formula 11.

$$Ni_{x11}M^{11}_{y11}M^{12}_{1-x11-y11}(OH)_2 \quad \text{[Chemical Formula 11]}$$

In Chemical Formula 11, $0.3 \le x11 \le 1$, $0 \le y11 \le 0.7$, and $M^{11}$ and $M^{12}$ may be independently selected from Al, B, Ba, Ca, Ce, Co, Cr, Cu, F, Fe, Mg, Mn, Mo, Nb, P, S, Si, Sr, Ti, V, W, Zr, and combinations thereof.

For example, the nickel-based hydroxide may be represented by Chemical Formula 12 or Chemical Formula 13.

$$Ni_{x12}CO_{y12}M^{13}_{1-x12-y12}(OH)_2 \quad \text{[Chemical Formula 12]}$$

In Chemical Formula 12, $0.3 \le x12 < 1$, $0 < y12 \le 0.7$, and $M^{13}$ may be selected from Al, B, Ba, Ca, Ce, Cr, Cu, F, Fe, Mg, Mn, Mo, Nb, P, S, Si, Sr, Ti, V, W, Zr, and combinations thereof.

$$Ni_{x13}CO_{y13}M^{14}_{z13}M^{15}_{1-x13-yl3-z13}(OH)_2 \quad \text{[Chemical Formula 13]}$$

In Chemical Formula 13, $0.3 \le x13 \le 0.98$, $0.01 \le y13 \le 0.69$, $0.01 \le z13 \le 0.69$, $M^{14}$ may be selected from Al, Mn, and combinations thereof, and $M^{15}$ may be selected from B, Ba, Ca, Ce, Cr, Cu, F, Fe, Mg, Mo, Nb, P, S, Si, Sr, Ti, V, W, Zr, and combinations thereof.

The lithium raw material may be, for example, lithium hydroxide and/or the like, and may be mixed in a ratio (e.g., amount) of about 0.8 mole to about 1.8 mole, or about 0.9 mole to about 1.8 mole, or about 0.8 mole to about 1.2 mole based on 1 mole of a total amount of metals of the nickel-based hydroxide.

The boron raw material may be a compound containing boron, for example, $H_3BO_3$, $HBO_2$, $B_2O_3$, $C_6H_5B(OH)_2$, $(C_6H_5O)_3B$, $[CH_3(CH_2)_3O]_3B$, $(C_3H_7O)_3B$, $C_3H_9B_3O_6$, $C_{13}H_{19}BO_3$, or a combination thereof.

The content (e.g., amount) of the boron raw material may be about 0.1 mol % to about 3 mol %, for example about 0.1 mol % to about 2.9 mol %, about 0.1 mol % to about 2.5 mol %, about 0.1 mol % to about 2 mol %, about 0.1 mol % to about 1.5 mol %, or about 0.5 mol % to about 1.3 mol % based on 100 mol % of the nickel-based hydroxide. When the content (e.g., amount) of boron raw material satisfies the above range, boron does not act as a resistance in the positive active material and may serve to improve performance of an all-solid-state battery, thereby improving capacity and improving cycle-life characteristics. When the content (e.g., amount) of the boron raw material is excessive, the content (e.g., amount) of the first boron coating portion is excessively increased, and boron acts as a resistance in the positive active material, thereby reducing the capacity and cycle-life of the battery.

The heat-treating may be performed at a temperature of about 650° C. to about 850° C., or about 690° C. to about 780° C. In this case, a positive active material for an all-solid-state battery having a stable structure while including both (e.g., simultaneously) the first boron coating portion and the second boron coating portion may be prepared.

In some embodiments, the heat-treating may be performed for about 5 hours to about to 25 hours, for example, about 5 hours to about to 20 hours, about 8 hours to about 12 hours. In this case, a positive active material for an all-solid-state battery having a stable structure including both (e.g., simultaneously) the first boron coating portion and the second boron coating portion is prepared.

All-Solid-State Battery

In an embodiment, an all-solid-state battery includes a positive electrode including the aforementioned positive active material, a negative electrode, and a solid electrolyte layer between the positive electrode and the negative electrode. The all-solid-state battery may also be expressed as an all-solid-state rechargeable battery.

Figure 4A:
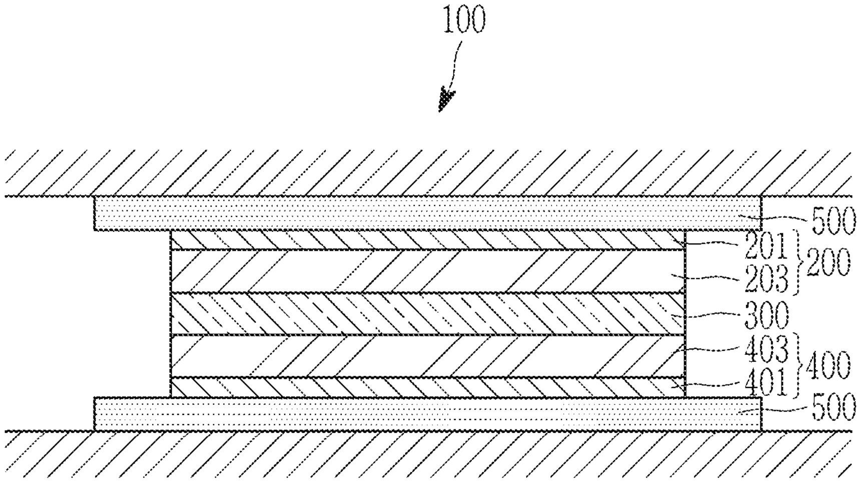
FIG. 4A is a cross-sectional view schematically illustrating an all-solid-state battery according to an embodiment.

FIG. 4A is a cross-sectional view schematically illustrating an all-solid-state battery according to an embodiment. Referring to FIG. 4A, the all-solid-state battery 100 may have a structure including an electrode assembly, in which a negative electrode 400 including a negative current collector 401 and a negative active material layer 403, a solid electrolyte layer 300, and a positive electrode 200 including a positive active material layer 203 and a positive current collector 201 are stacked, and the electrode assembly is inserted into a case such as a pouch and/or the like. The all-solid-state battery 100 may further include at least one elastic layer 500 on the outside of at least one of the positive electrode 200 or the negative electrode 400. FIG. 4A shows one electrode assembly including the negative electrode 400, the solid electrolyte layer 300, and the positive electrode 200, but in other embodiments, two or more electrode assemblies may be stacked to manufacture an all-solid-state battery.

Positive Electrode

A positive electrode for an all-solid-state battery may include a current collector and a positive active material layer on the current collector. The positive active material layer includes the aforementioned positive active material and may further include a binder, a conductive material, a dispersant, and/or a solid electrolyte.

The binder improves binding properties of positive active material particles with one another and with a current collector. Examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The content (e.g., amount) of the binder in the positive active material layer may be about 1 wt % to about 5 wt % or about 0.5 wt % to about 3 wt % based on the total weight of the positive active material layer.

The conductive material is included to provide electrode conductivity. Any electrically conductive material may be utilized as a conductive material unless it causes a chemical change. Examples of the conductive material may include a carbon-based material (such as natural graphite, artificial graphite, carbon black, acetylene black, ketjen black, a carbon fiber, carbon nanotube, and/or the like); a metal-based material of a metal powder or a metal fiber including copper, nickel, aluminum, silver, and/or the like; a conductive polymer (such as a polyphenylene derivative); or a mixture thereof. In the positive active material layer, the content (e.g., amount) of the conductive material may be about 0.1 wt % to about 5 wt %, or about 0.3 wt % to about 3 wt % based on the total weight of the positive active material layer.

The content (e.g., amount) of the solid electrolyte in the positive active material layer may be about 0 wt % to about 35 wt %, for example, about 0.1 wt % to about 35 wt %, about 1 wt % to about 35 wt %, about 5 wt % to about 30 wt %, about 8 wt % % to about 25 wt %, or about 10 wt % to about 20 wt %. A detailed description of the solid electrolyte is included in the description of the all-solid-state battery.

An aluminum foil may be utilized as the positive current collector, but the present disclosure is not limited thereto.

Negative Electrode

The negative electrode for an all-solid-state battery may include, for example, a current collector and a negative active material layer on the current collector. The negative active material layer includes a negative active material, and may further include a binder, a conductive material, and/or a solid electrolyte.

The negative active material may include a material that reversibly intercalates/deintercalates lithium ions, a lithium metal, a lithium metal alloy, a material capable of doping/dedoping lithium, or transition metal oxide.

The material that reversibly intercalates/deintercalates lithium ions may include, for example, crystalline carbon, amorphous carbon, or a combination thereof as a carbon-based negative active material. The crystalline carbon may be non-shaped (e.g., having no set shape), or sheet, flake, spherical, or fiber shaped natural graphite or artificial graphite. The amorphous carbon may be a soft carbon, a hard carbon, a mesophase pitch carbonization product, calcined coke, and/or the like.

The lithium metal alloy includes an alloy of lithium and a metal selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn).

The material capable of doping/dedoping lithium may be a Si-based negative active material or a Sn-based negative active material. The Si-based negative active material may include silicon, a silicon-carbon composite, $SiO_x$ ($0<x<2$), a Si-Q alloy (wherein Q is an alkali metal, an alkaline-earth metal, a Group 13 element, a Group 14 element excluding Si, a Group 15 element, a Group 16 element, a transition metal, a rare earth element, and a combination thereof) and the Sn-based negative active material may include Sn, $SnO_2$, Sn—R alloy (wherein R is an alkali metal, an alkaline-earth metal, a Group 13 element, a Group 14 element excluding Sn, a Group 15 element, a Group 16 element, a transition metal, a rare earth element, and a combination thereof). At least one of these materials may be mixed with $SiO_2$. The elements Q and R may be selected from magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur(S), selenium (Se), tellurium (Te), polonium (Po), and combinations thereof.

The silicon-carbon composite may be, for example, a silicon-carbon composite including a core including crystalline carbon and silicon particles and an amorphous carbon coating layer disposed on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, or a polymer resin (such as a phenol resin, a furan resin, or a polyimide resin). In this case, the content (e.g., amount) of silicon may be about 10 wt % to about 50 wt % based on the total weight of the silicon-carbon composite. In some embodiments, the content (e.g., amount) of the crystalline carbon may be about 10 wt % to about 70 wt % based on the total weight of the silicon-carbon composite, and the content (e.g., amount) of the amorphous carbon may be about 20 wt % to about 40 wt % based on the total weight of the silicon-carbon composite. In some embodiments, a thickness of the amorphous carbon coating layer may be about 5 nm to about 100 nm. An average particle diameter (D50) of the silicon particles may be about 10 nm to about 20 μm. The average particle diameter (D50) of the silicon particles may be about 10 nm to about 200 nm. The silicon particles may exist in an oxidized form, and in this case, an atomic content (e.g., amount) ratio of Si:O in the silicon particles indicating a degree of oxidation may be a weight ratio of about 99:1 to about 33:66. The silicon particles may be $SiO_x$ particles, and in this case, the range of x in $SiO_x$ may be greater than about 0 and less than about 2. In the present specification, unless otherwise defined, the term "average particle diameter (D50)" refers to the diameter of a particle where an accumulated volume is about 50 volume % in a particle size distribution.

The Si-based negative active material or Sn-based negative active material may be mixed with the carbon-based negative active material. When the Si-based negative active material or Sn-based negative active material and the carbon-based negative active material are mixed and utilized, the mixing ratio may be a weight ratio of about 1:99 to about 90:10.

In the negative active material layer, the negative active material may be included in an amount of about 95 wt % to about 99 wt % based on the total weight of the negative active material layer.

In an embodiment, the negative active material layer further includes a binder, and may optionally further include a conductive material. The content (e.g., amount) of the binder in the negative active material layer may be about 1 wt % to about 5 wt % based on the total weight of the negative active material layer. In some embodiments, when the conductive material is further included, the negative active material layer may include about 90 wt % to about 98 wt % of the negative active material, about 1 wt % to about 5 wt % of the binder, and about 1 wt % to about 5 wt % of the conductive material.

The binder may facilitate adherence of the negative active material particles to each other and to the current collector. The binder may be a water-insoluble binder, a water-soluble binder, or a combination thereof.

Examples of the water-insoluble binder may include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoroethylene, polyvinylidene fluoride, polyethylene, polypropylene, polyamideimide, polyimide, and combinations thereof.

The water-soluble binder may include a rubber binder or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and combinations thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and combinations thereof.

When a water-soluble binder is utilized as the negative electrode binder, a cellulose-based compound capable of imparting viscosity may be further included. As the cellulose-based compound, one or more of carboxymethyl cellulose, hydroxypropylmethyl cellulose, methyl cellulose, or alkali metal salts thereof may be mixed and utilized. As the alkali metal, Na, K or Li may be utilized. The amount of the thickener may be about 0.1 parts by weight to about 3 parts by weight based on 100 parts by weight of the negative active material.

The conductive material is included to provide electrode conductivity. Any electrically conductive material may be utilized as a conductive material unless it causes a chemical change. Examples of the conductive material may include a carbon-based material (such as natural graphite, artificial graphite, carbon black, acetylene black, ketjen black, a carbon fiber, carbon nanotube, and/or the like); a metal-based material of a metal powder and/or a metal fiber including copper, nickel, aluminum silver, and/or the like; a conductive polymer (such as a polyphenylene derivative); or mixtures thereof.

The negative current collector may include one selected from a copper foil, a nickel foil, a stainless steel foil, a titanium foil, a nickel foam, a copper foam, a polymer substrate coated with a conductive metal, and combinations thereof.

Figure 4B:
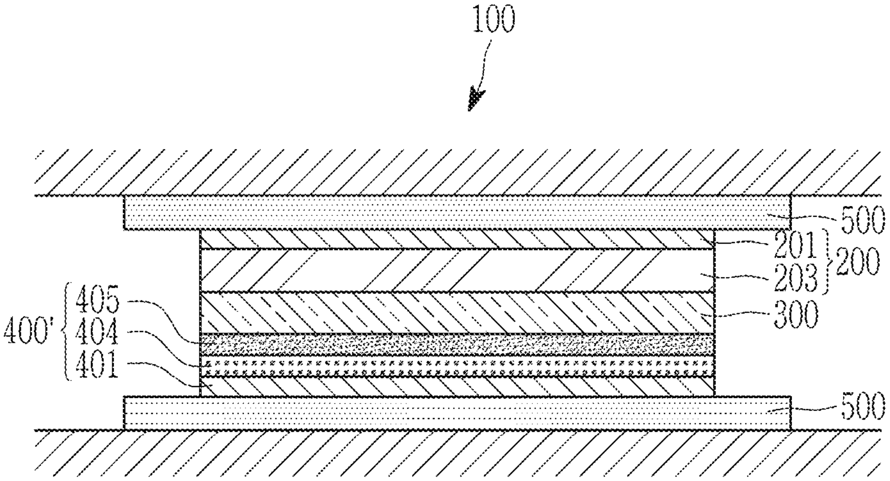
FIG. 4B is a cross-sectional view schematically illustrating an all-solid-state battery according to an embodiment.

In some embodiments, the negative electrode for an all-solid-state battery may be, for example, a precipitation-type (e.g. precipitation source) negative electrode. The precipitation-type negative electrode may be a negative electrode which has no negative active material during the assembly of the electrochemical battery but in which a lithium metal and/or the like are precipitated during the charge of the electrochemical battery and serve as a negative active material. FIG. 4B is a schematic cross-sectional view of an all-solid-state battery including a precipitation-type negative electrode. Referring to FIG. 4B, the precipitation-type negative electrode 400' may include the current collector 401 and a negative electrode catalyst layer 405 disposed on the current collector. The rechargeable lithium battery having this precipitation-type negative electrode 400' is initially charged in absence of a negative active material, and a lithium metal with high density and/or the like (e.g., a lithium alloy) is precipitated between the current collector 401 and the negative electrode catalyst layer 405 during the charge to form a lithium metal layer 404, which may work as a negative active material. Accordingly, the precipitation-type negative electrode 400', in the all-solid-state battery which is more than once charged, may include the current collector 401, the lithium metal layer 404 on the current collector, and the negative electrode catalyst layer 405 on the metal layer 404. The lithium metal layer 404 is a layer of the lithium metal and/or the like precipitated during the charge of the electrochemical battery and may be referred to as a metal layer, a negative active material layer, and/or the like, and may act as a negative active material.

The negative electrode catalyst layer 405 may include a metal and/or a carbon material which plays a role of a catalyst.

The metal may include gold, platinum, palladium, silicon, silver, aluminum, bismuth, tin, zinc, or a combination or alloy of two or more thereof. The metal included in the negative electrode catalyst layer may have an average particle diameter (D50) of less than or equal to about 4 μm, for example, about 10 nm to about 4 μm.

The carbon material may be, for example, crystalline carbon, non-graphitic carbon, or a combination thereof. The crystalline carbon may be, for example, at least one selected from natural graphite, artificial graphite, mesophase carbon microbeads, and combinations thereof. The non-graphite-based carbon may be at least one selected from carbon black, activated carbon, acetylene black, denka black, ketjen black, and combinations thereof.

When the negative electrode catalyst layer 405 includes the metal and the carbon material, the metal and the carbon material may be, for example, mixed in a weight ratio of about 1:10 to about 2:1. The precipitation of the lithium metal may thus be effectively promoted and improve characteristics of the all-solid-state battery. The negative electrode catalyst layer may include, for example, a carbon material on which a catalyst metal is supported or a mixture of metal particles and carbon material particles.

The negative electrode catalyst layer 405 may further include a binder, and the binder may be a conductive binder. In some embodiments, the negative electrode catalyst layer may further include general additives (such as a filler, a dispersing agent, an ion conductive agent, and/or the like). In an embodiment, the negative electrode catalyst layer may not include (e.g., may exclude) a negative active material.

The negative electrode catalyst layer 405 may have, for example, a thickness of about 1 μm to about 20 μm.

In some embodiments, the precipitation-type negative electrode 400' may further include a thin film, for example, on the surface of the current collector, that is, between the current collector and the negative electrode catalyst layer. The thin film may include an element capable of forming an alloy with lithium. The element capable of forming an alloy with lithium may be, for example, gold, silver, zinc, tin, indium, silicon, aluminum, bismuth, and/or the like, which may be utilized alone or an alloy of more than one. The thin film may further planarize a precipitation shape of the metal layer and much improve characteristics of the all-solid-state battery. The thin film may be formed, for example, in a vacuum deposition method, a sputtering method, a plating method, and/or the like. The thin film may have, for example, a thickness of about 1 nm to about 500 nm.

Solid Electrolyte Layer

The solid electrolyte layer 300 includes a solid electrolyte, and the solid electrolyte may be an inorganic solid electrolyte such as a sulfide-based solid electrolyte or an oxide-based solid electrolyte, or a solid polymer electrolyte.

In an embodiment, the solid electrolyte may be a sulfide-based solid electrolyte having excellent or suitable ion conductivity. The sulfide-based solid electrolyte may be, for example, $Li_2S—P_2S_5$, $Li_2S—P_2S_5—LiX$ (where X is a halogen element, for example I or Cl), $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (where m and n are each an integer and Z is Ge, Zn or Ga), $Li_2S—GeS_2$, $Li_2S—SiS_2—Li_3PO_4$, $Li_2S—SiS_2$-$Li_pMO_q$ (where p and q are integers and M is P, Si, Ge, B, Al, Ga, or In) and/or the like.

The sulfide-based solid electrolyte may be obtained by, for example, mixing $Li_2S$ and $P_2S_5$ in a mole ratio of about 50:50 to about 90:10 or about 50:50 to about 80:20. Within the mixing ratio range, a sulfide-based solid electrolyte having excellent or suitable ionic conductivity may be prepared. The ionic conductivity may be further improved by adding $SiS_2$, $GeS_2$, $B_2S_3$, and/or the like as other components thereto. The mixing may be performed by a mechanical milling method and/or a solution method. The mechanical milling method may convert starting materials into particulates by putting the starting materials together with metal balls and/or the like in a reactor and fervently stirring them. The solution method may be performed by mixing the starting materials in a solvent to obtain a solid electrolyte as a precipitate. In some embodiments, after the mixing, firing may be additionally performed. When the additional firing is performed, the solid electrolyte may be obtained as rigid crystals.

For example, the solid electrolyte may be an argyrodite-type or kind sulfide-based solid electrolyte. The sulfide-based solid electrolyte may be, for example, $Li_aM_bP_cS_dA_e$ (where a, b, c, d, and e are all greater than or equal to about 0 and less than or equal to about 12, M is Ge, Sn, Si, or a combination thereof, and A is one of F, Cl, Br, or I) and for example, $Li_3PS_4$, $Li_7P_3S_{11}$, $Li_6PS_5Cl$, and/or the like. This sulfide-based solid electrolyte may have a high ionic conductivity of close to about $10^{-4}$ to about $10^{-}$ S/cm at room temperature, which is similar to the ionic conductivity of a general liquid electrolyte, and may thus form a close interface between the electrode layer and the solid electrolyte layer without deteriorating the ion conductivity. An all-solid-state rechargeable battery including the same may exhibit improved battery performance such as rate capability, coulomb efficiency, and cycle-life characteristics.

The sulfide-based solid electrolyte may be amorphous or crystalline, and may be in a mixed state.

The solid electrolyte may be an oxide-based inorganic solid electrolyte in addition to the sulfide-based material, and may include, for example, $Li_{1+x}Ti_{2-x}Al(PO_4)_3$ (LTAP) ($0 \leq x \leq 4$), $Li_{1+x+y}Al_xTi_{2-x}Si_yP_{3-y}O_{12}$ ($0<x<2$, $0 \leq y<3$), $BaTiO_3$, $Pb(Zr, Ti)O_3$ (PZT), $Pb_{1-x}La_xZr_{1-y}Ti_yO_3$ (PLZT) ($0 \leq x<1$, $0 \leq y<1$), $Pb(Mg_3Nb_{2/3})O_3—PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, lithium phosphate ($Li_3PO_4$), lithium titanium phosphate ($Li_xTi_y(PO_4)_3$, $0<x<2$, $0<y<3$), $Li_{1+x+y}(Al, Ga)_x(Ti, Ge)_{2-x}Si_yP_{3-y}O_{12}$($0 \leq x \leq 1$, $0 \leq y \leq 1$), lithium lanthanum titanate ($Li_xLa_y TiO_3$, $0<x<2$, $0<y<3$), $Li_2O$, $LiAlO_2$, $Li_2O—Al_2O_3—SiO_2—P_2O_5—TiO_2—GeO_2$ based ceramics, Garnet based ceramics $Li_{3+x}La_3M_2O_{12}$ (M=Te, Nb, or Zr; x is an integer from 1 to 10), or mixtures thereof.

The solid electrolyte included in the solid electrolyte layer may be in the form of particles, and the average particle diameter (D50) thereof may be less than or equal to about 5.0 μm, for example, about 0.5 μm to about 5.0 μm. Such a solid electrolyte may form an intimate interface between the positive electrode layer and the solid electrolyte layer without causing a short circuit.

The solid electrolyte layer may further include a binder. Herein, the binder may include a styrene butadiene rubber, polytetrafluoroethylene, polyvinylidene fluoride, polyethylene, an acrylate-based polymer, or a combination thereof, but is not limited thereto. The acrylate-based polymer may be, for example, butyl acrylate, polyacrylate, polymethacrylate, or a combination thereof.

The solid electrolyte layer may be formed by adding a solid electrolyte to a binder solution, coating it on a base film, and drying the resultant. The solvent of the binder solution may be isobutyl isobutyrate, xylene, toluene, benzene, hexane, or a combination thereof. Forming processes of the solid electrolyte layer are well known in the art, and a detailed description thereof will not be provided.

A thickness of the solid electrolyte layer may be, for example, about 10 μm to about 150 μm.

The solid electrolyte layer may further include an alkali metal salt and/or an ionic liquid and/or a conductive polymer. For example, the solid electrolyte layer may further include a lithium salt and/or an ionic liquid and/or a conductive polymer.

A content (e.g., amount) of the lithium salt in the solid electrolyte layer may be greater than or equal to about 1 M, for example, about 1 M to about 4 M. In this case, the lithium salt may improve ionic conductivity by improving lithium ion mobility of the solid electrolyte layer.

The lithium salt may include, for example, LiSCN, $LiN(CN)_2$, $Li(CF_3SO_2)_3C$, $LiC_4F_9SO_3$, $LiN(SO_2CF_2CF_3)_2$, LiCl, LIF, LiBr, LiI, $LiB(C_2O_4)_2$, $LiBF_4$, $LiBF_3(C_2F_5)$, lithium bis(oxalato) borate (LiBOB), lithium oxalyldifluoroborate (LIODFB), lithium difluoro (oxalato) borate (LiDFOB), lithium bis(trifluoromethanesulfonyl)imide (LiTFSI, $LiN(SO_2CF_3)_2$), lithium bis(fluorosulfonyl)imide, LiFSI, $LiN(SO_2F)_2$), $LiCF_3SO_3$, $LiAsF_6$, $LiSbF_6$, $LiClO_4$, or mixtures thereof. In some embodiments, the lithium salt may be an imide-based lithium salt, for example, the imide-based lithium salt may be lithium bis(trifluoromethanesulfonyl) imide (LiTFSI, $LiN(SO_2CF_3)_2$), and/or lithium bis(fluorosulfonyl)imide (LiFSI, $LiN(SO_2F)_2$). The lithium salt may maintain or improve ionic conductivity by maintaining suitable chemical reactivity with the ionic liquid.

The term "ionic liquid" may refer to a salt in a liquid state at room temperature or a room temperature molten salt that has a melting point of room temperature or lower and is only formed of ions. The ionic liquid may be a compound including: a) a cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, a triazolium-based cation, or a combination thereof; and b) an anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)\,N^-$, and $(CF_3SO_2)_2N^-$. The ionic liquid may be, for example, at least one selected from the group consisting of N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, 1-ethyl-3-methylimidazolium bis(trifluoromethylsulfonyl)imide, or a combination thereof.

A weight ratio of the solid electrolyte and the ionic liquid in the solid electrolyte layer may be about 0.1:99.9 to about 90:10, for example, about 10:90 to about 90:10, about 20:80 to about 90:10, about 30:70 to about 90:10, about 40:60 to about 90:10, or about 50:50 to about 90:10. The solid electrolyte layer satisfying the above ranges may maintain or improve ionic conductivity by improving the electrochemical contact area with the electrode. Accordingly, the energy density, discharge capacity, rate capability, etc. of the all-solid-state battery may be improved.

The all-solid-state secondary battery may be a unit cell having a structure of a positive electrode/solid electrolyte layer/negative electrode, a bi-cell having a structure of positive electrode/solid electrolyte layer/negative electrode/solid electrolyte layer/positive electrode, or a stacked battery in which the structure of the unit cell is repeated.

The shape of the all-solid-state battery is not particularly limited, and may be, for example, a coin type or format, a button type or format, a sheet type or format, a stack type or format, a cylindrical shape, a flat type or format, and/or the like. In some embodiments, the all-solid-state battery may be applied to a large-sized battery utilized in an electric vehicle and/or the like. For example, the all-solid-state battery may also be utilized in a hybrid vehicle (such as a plug-in hybrid electric vehicle (PHEV)). In some embodiments, it may be utilized in a field requiring a large amount of power storage, and may be utilized, for example, in an electric bicycle or a power tool.

Hereinafter, examples of the present disclosure and comparative examples are described. It is to be understood, however, that the examples are for the purpose of illustration and are not to be construed as limiting the present disclosure.

Example 1

1. Preparation of Positive Active Material Precursor

A nickel-based hydroxide $Ni_{0.91}Co_{0.09}(OH)_2$ is synthesized in a co-precipitation method, which is described later. Nickel sulfate and cobalt sulfate are utilized as metal raw materials. A reaction system uses a batch reactor with an effective reaction volume of 85.5 L and a concentration system allowing substantially continuous removal of a solution other than co-precipitates.

[First Step (Act): 4.5 kW/m$^3$, $NH_4OH$ 0.25 M, pH 11.8 to 12.0, and Reaction Time of 6 Hours]

First, ammonia water having a concentration of 0.25 M was put in a reactor. Metal raw materials and a complex (e.g., complexing) agent were respectively added thereto at 107 mL/min and 25 mL/min at 50° C. under a stirring power of 4.5 kW/m$^3$ and a reaction is started. NaOH was added thereto to maintain pH, the reaction was performed for 6 hours. After confirming that the particle size continued to decrease for up to 6 hours to form a core, the second step was performed as follows.

[Second Step (Act): 3.5 kW/m$^3$, $NH_4OH$ 0.30 M, pH 11.8 to 12.0, and Reaction Time of 15 Hours]

The metal raw materials and the complex agent were respectively added thereto at 142 mL/min and 33 mL/min, while the reaction temperature was maintained at 50° C., so that the complex agent maintained a concentration of 0.30 M. While adding NaOH thereto in order to maintain pH, the reaction was performed for 15 hours. At this time, the stirring power was lowered to 3.5 kW/m$^3$, which is lower than the first step, and the reaction proceeded. After confirming that the obtained product containing a core and a surface layer has an average size of 3.5 μm to 3.8 μm, the reaction was terminated.

[Post-Process]

The obtained resulting material is washed and then, dried with hot air at about 150° C. for 24 hours, obtaining a nickel-based hydroxide $Ni_{0.91}Co_{0.09}(OH)_2$.

2. Preparation of Positive Active Material

The obtained nickel-based hydroxide was mixed with LiOH in a mole ratio of 1:1, and 1.0 mol % of boric acid was added thereto based on the nickel-based hydroxide and then, heat-treated at 725° C. for 10 hours under an oxygen atmosphere, obtaining a positive active material ($LiNi_{0.91}Co_{0.09}O_2$) in which a boron compound is coated at the inner grain boundaries and on the surface.

3. Manufacture of Positive Electrode 85 wt % of the obtained positive active material, 13.5 wt % of a lithium argyrodite-type solid electrolyte $Li_6PS_5Cl$, 1.0 wt % of a binder, 0.4 wt % of carbon nanotube conductive material, and 0.1 wt % of a dispersing agent were added to an isobutyl isobutyrate (IBIB) solvent, and 2 mm zirconia balls were added thereto and then, stirred with a Thinky mixer to prepare a slurry. The slurry was coated on a positive current collector and then, dried to manufacture a positive electrode.

4. Manufacture of Solid Electrolyte Layer

Isobutyl isobutyrate (IBIB) as a binder solution is added to an argyrodite-type solid electrolyte $Li_6PS_5Cl$, and then mixed. The mixture was stirred with a Thinky mixer to adjust to an appropriate or suitable viscosity. After adjusting the viscosity, 2 mm zirconia balls were added thereto and then stirred again with the Thinky mixer to prepare a slurry. The slurry was cast on a release PET film and dried at room temperature to form a solid electrolyte layer.

5. Manufacture of Negative Electrode

A precipitation-type negative electrode was prepared by coating carbon, on which Ag as a catalyst is supported, as a slurry on a negative current collector and drying it.

6. Manufacture of all-Solid-State Battery Cell

The positive electrode, the negative electrode, and the solid electrolyte layer are cut, and after stacking the solid electrolyte on the positive electrode, and the negative electrode is stacked thereon. The stacked product is sealed into a pouch form and warm-isostatic pressed (WIP) with 500 MPa for 30 minutes at a high temperature, obtaining an all-solid-state battery cell.

Example 2

A positive active material and an all-solid-state battery cell were manufactured according to substantially the same method as Example 1 except that aluminum nitrate as a metal raw material is further utilized to obtain $Ni_{0.945}Co_{0.04}Al_{0.015}(OH)_2$ in preparing the positive active material precursor of Example 1. The $Ni_{0.945}Co_{0.04}Al_{0.015}(OH)_2$ was utilized as a positive active material precursor, and 0.5 mol % of boric acid is added thereto and then, heat-treated at 700° C. to prepare the positive active material of Example 1.

Comparative Example 1

A positive active material is prepared according to substantially the same method as Example 1, except that boric acid was not added in preparing the positive active material of Example 1. The positive active material is mixed with lithium ethoxide and zirconium propoxide in ethanol to form a LizO·$ZrO_2$-type (e.g., $Li_2O·ZrO_2$ composition) buffer layer on the surface through spray-drying which is a method that enables recovery of organic solvents, and can avoid contact with external air. Subsequently, a positive electrode and an all-solid-state battery cell were manufactured according to substantially the same method as Example 1.

Comparative Example 2

A positive active material and an all-solid-state battery cell were manufactured according to substantially the same method as Example 1, except that a positive active material precursor was prepared according to the following method, and boric acid was not added in preparing the positive active material.

$Ni_{0.91}Co_{0.09}$ $(OH)_2$, which is a nickel-based hydroxide, was synthesized by utilizing a substantially continuous stirred tank reactor (CSTR), which is generally utilized in the industry. An effective reaction volume is 83 L. As for the metal raw materials, nickel sulfate and cobalt sulfate are utilized.

First, ammonia water at a concentration of 0.35 M was put in a reactor. Then, a reaction was started with a stirring power of 3.0 kW/m$^3$ at a reaction temperature of 50° C., while the metal raw materials and a complex agent were injected thereinto respectively at 71 mL/min and 25 mL/min, The positive active material precursor is obtained after conducting the reaction for 30 hours, while NaOH is injected thereinto in order to maintain pH.

Comparative Example 3

After preparing a $LiNi_{0.91}Co_{0.09}O_2$ active material not coated with a boron compound (e.g., without adding boric acid) in preparing the positive active material of Example 1, the boron compound is coated on the $LiNi_{0.91}Co_{0.09}O_2$ active material according to a previously-described related art method. $LiNi_{0.91}Co_{0.09}O_2$ was mixed with 1.0 mol % of boric acid and then, secondarily heat-treated at 350° C. for 8 hours under an oxygen atmosphere to obtain a positive active material coated with the boron compound on the surface. Then, a positive electrode and an all-solid-state battery cell were manufactured according to substantially the same method as Example 1 except the obtained positive active material was utilized as a positive active material.

Evaluation Example 1: SEM Photograph

Figure 5:
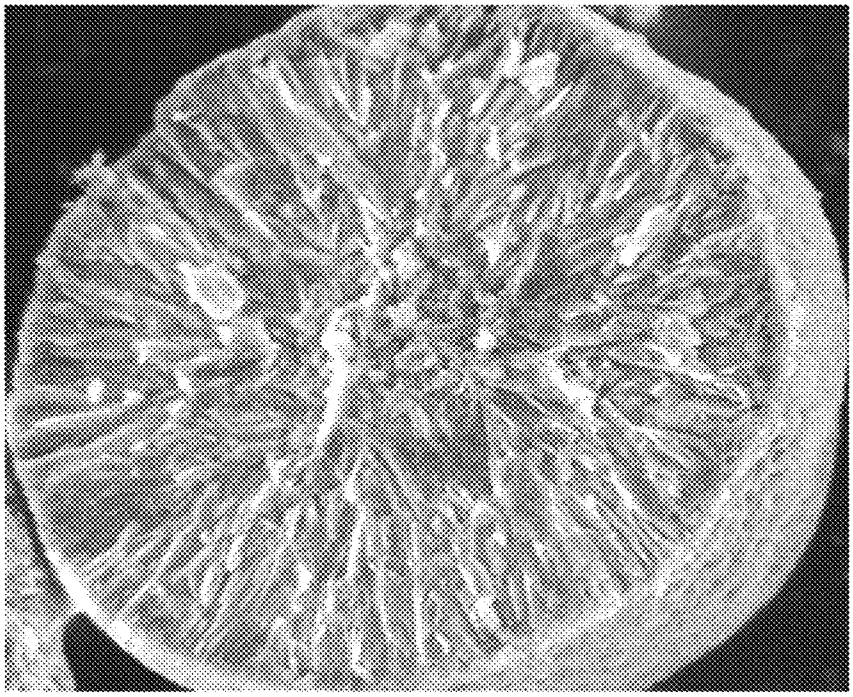
FIG. 5 is a scanning electron microscopic (SEM) image of a fracture surface of a precursor of the positive active material of Example 1.
Figure 6:
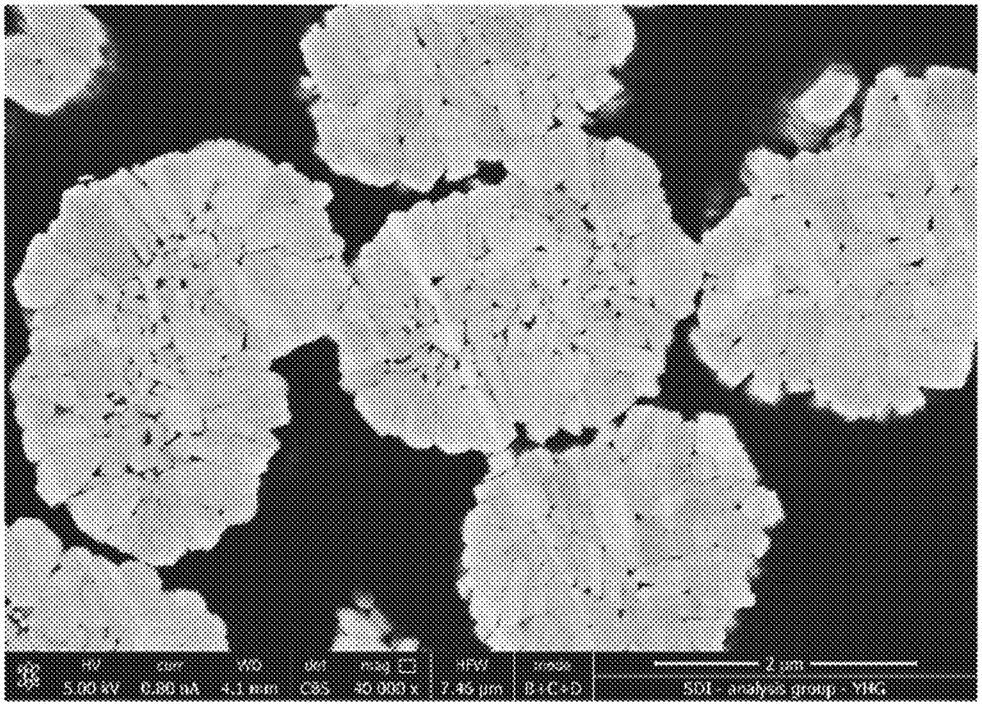
FIG. 6 is a scanning electron microscopic (SEM) image of a cross-section of the positive active material of Example 1.
Figure 7:
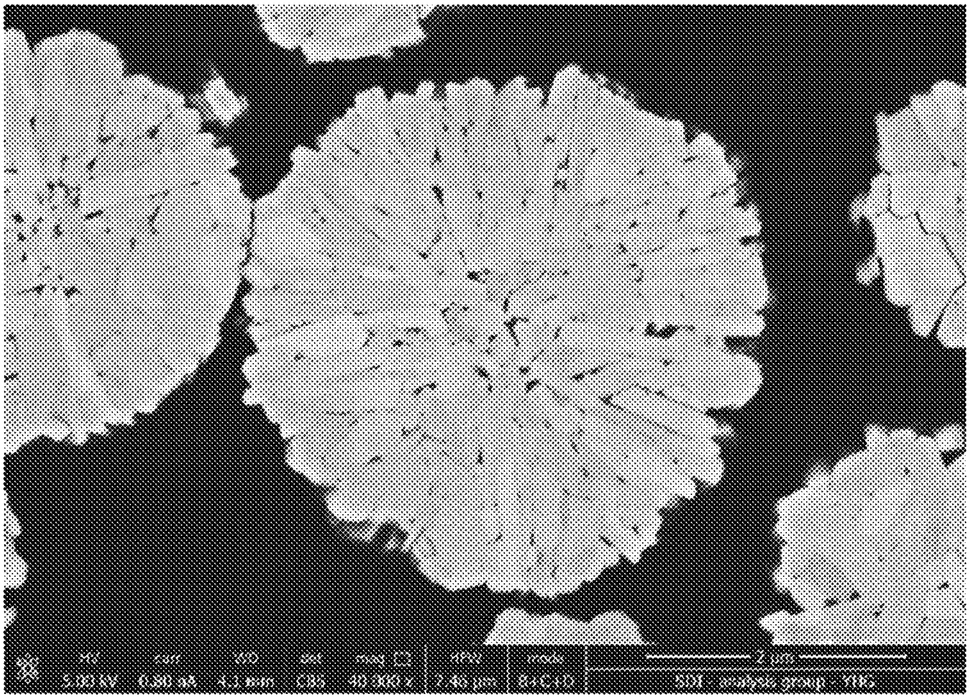
FIG. 7 is a scanning electron microscopic (SEM) image of a cross-section of the positive active material of Example 2.

FIG. 5 is a scanning electron microscopic image showing a fractured surface of the precursor of the positive active material of Example 1, which has a pore layer in the center (e.g., a porous interior portion) and a surface (e.g., outer) portion in which primary particles are radially oriented on the surface of secondary particles. In addition, because the surface is porous and easily contracted, as shown in FIGS. 6 to 7, the small primary particles maintain the radially oriented structure after the positive active material is prepared.

Figure 8:
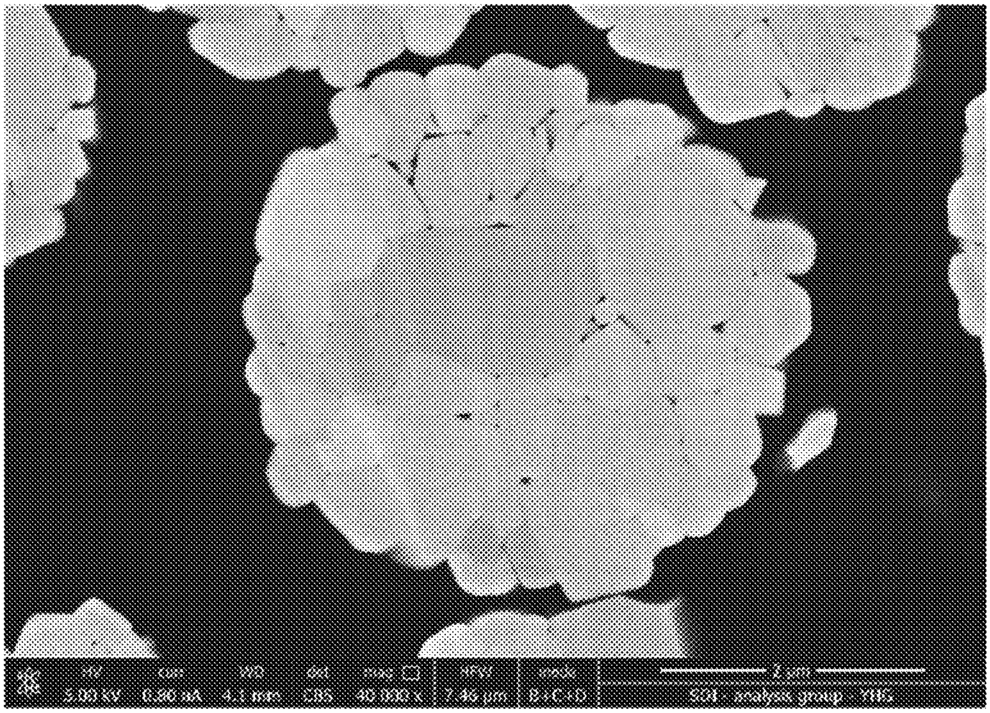
FIG. 8 is a scanning electron microscopic (SEM) image of a cross-section of the positive active material of Comparative Example 2.

FIG. 8 is a cross-sectional image of the synthesized positive active material according to Comparative Example 2, which shows that when general precursors are synthesized without adding boron thereto, the primary particles are relatively large and have no radially oriented structure.

Evaluation Example 2: Components on the Surface of Active Material

Figure 9:
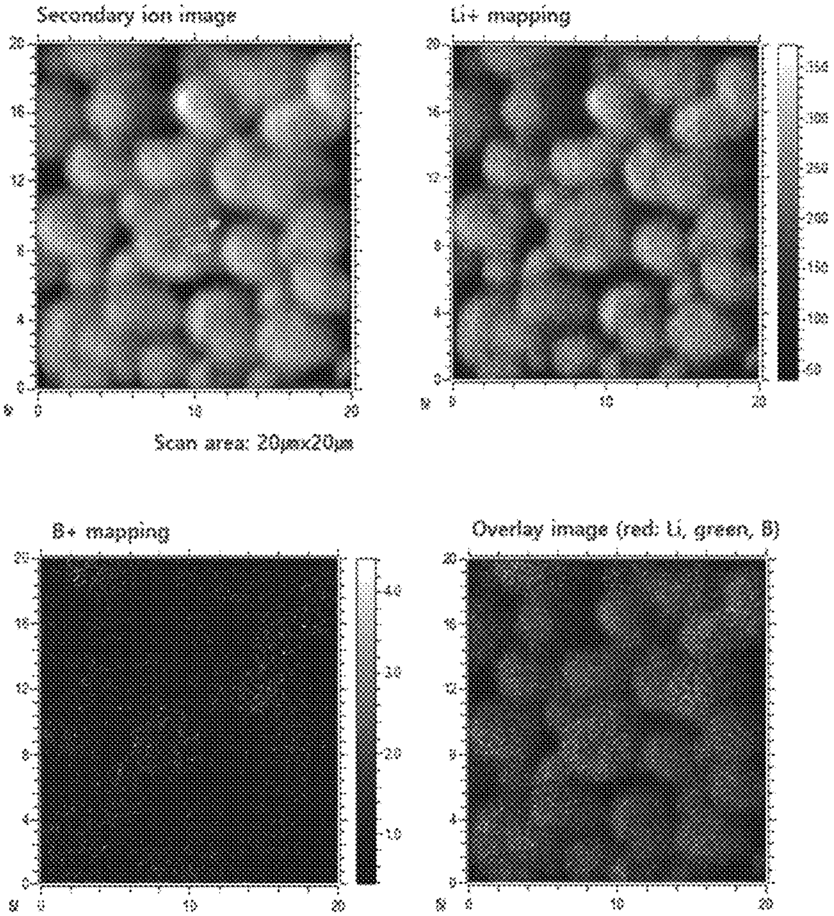
FIG. 9 is a Time-of-Flight Secondary Ion Mass Spectrometry (ToF-SIMS) analysis image of the positive active material of Example 1.
Figure 10:
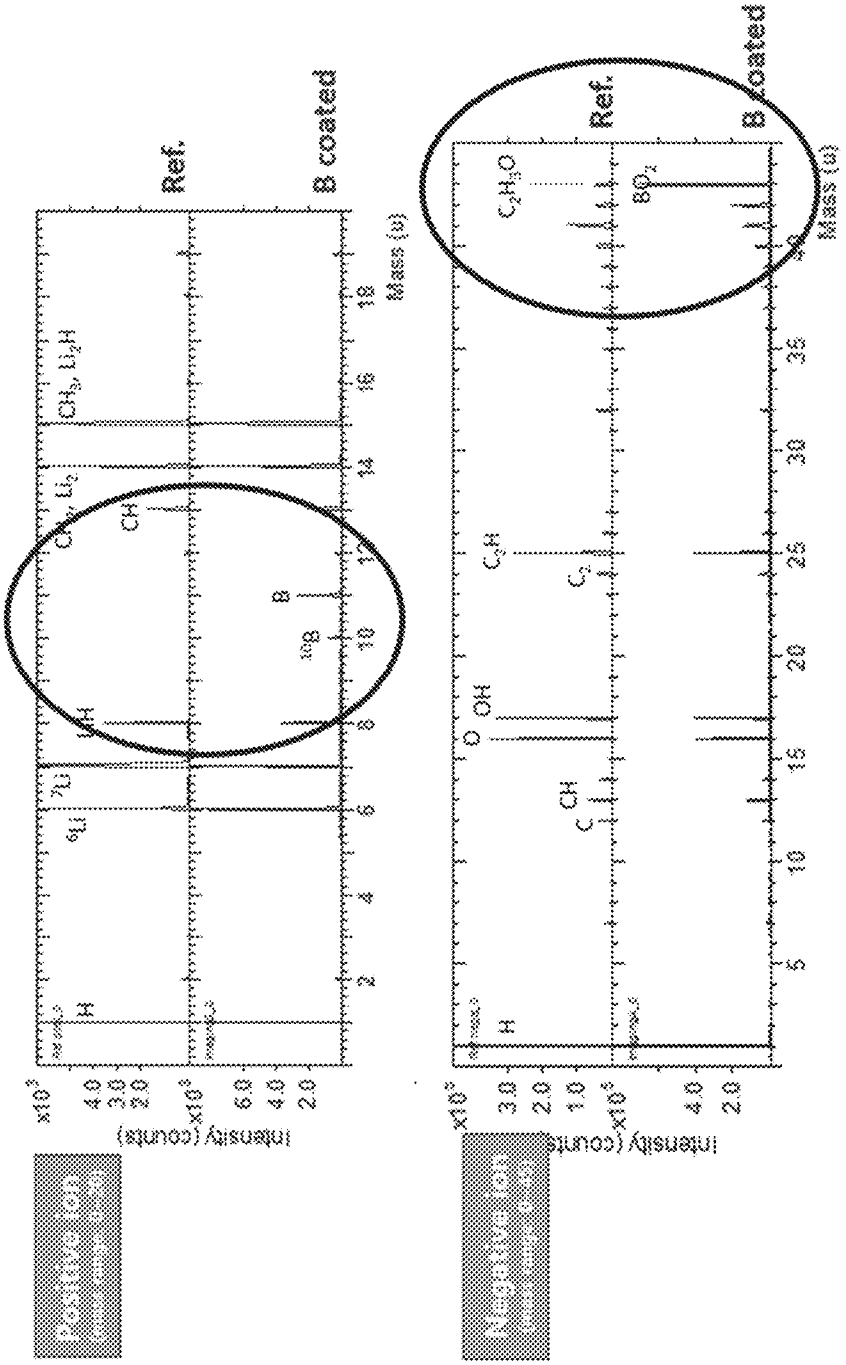
FIG. 10 is a mass spectrum result of the ToF-SIMS analysis of the positive active material of Example 1.
Figure 11:
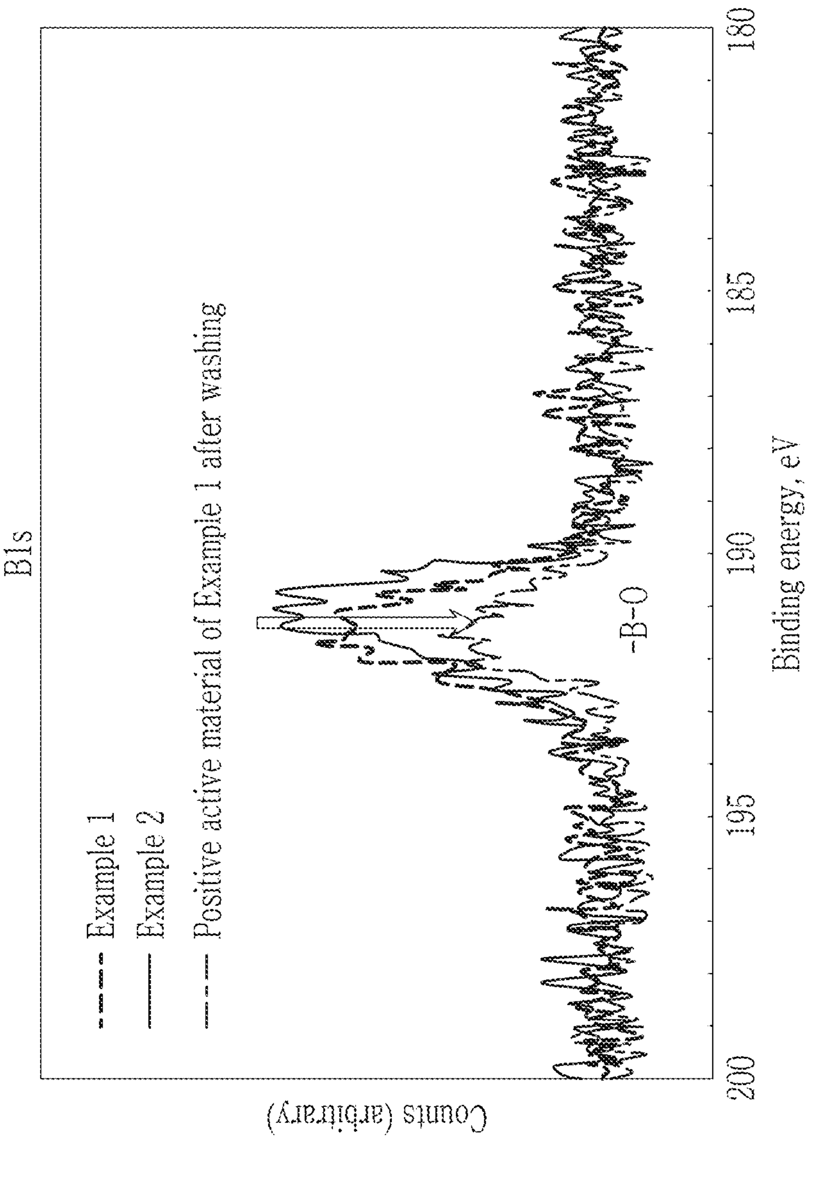
FIG. 11 is an X-ray spectroscopy (XPS) plot of the positive active material of Examples 1, 2 and the positive active material of Example 1 after washing.

FIG. 9 is a set of ToF-SIMS (Time-of-Flight Secondary Ion Mass Spectrometry) analysis images, FIG. 10 is a mass spectrum result of the ToF-SIMS analysis, and FIG. 11 is an XPS analysis (X-ray Photoelectron Spectroscopy) plot result.

As shown in FIG. 11, the presence of a material having a Li—B—O bond is confirmed by analyzing the binding energy, and is confirmed to be lithium borate by comparison to literature values.

FIG. 9 is a mapping of lithium (top right), boron (bottom left), and lithium and boron at the same time (e.g., simultaneously, bottom right), which shows that lithium borate is evenly distributed on the surface of the positive active material. The mass analysis result of FIG. 10 shows that $BO_2$ is relatively abundant (e.g., at the surface of the sample).

Combining the results of FIGS. 9 to 11, the lithium boron compound is evenly coated on the surface of the secondary particles of the positive active material, and $LiBO_2$ is a main component of the coating.

Evaluation Example 3: Evaluation of Boron Content on Surface and Inner Grain Boundary of Positive Active Material ICP (inductively coupled plasma) emission spectroscopic analysis was performed on the positive active material prepared in Example 1 to measure the content (e.g., amount) of boron. 10 g of each positive active material was added to 100 g of distilled water, stirred for 30 minutes, and filtered with a filter to obtain the positive active material. Through this washing process, boron on the surface of the positive active material was completely removed. The recovered positive active material was dried at 130° C. for 24 hours, and ICP emission spectroscopic analysis was again used to measure the remaining boron content, corresponding to the boron present in the inner portion of the positive active material (that is, on the grain boundaries). The difference in boron content before and after washing, that is, the boron content removed through the washing, was taken to be the boron content on the surface of the positive active material. In Table 1, the unit ppm may refer to $10^{-4}$ wt %, and may refer to the ratio of the weight of boron to the total weight of the positive active material.

TABLE 1

| | Boron content before washing (ppm) | Boron content at the inner grain boundary (ppm) | Boron content on the surface (ppm) |
|---|---|---|---|
| Example 1 | 940 | 185 | 755 |
| Example 2 | 540 | 30 | 510 |
| Comparative Example 3 | 1,020 | 0 | 1,020 |

In Table 1, the boron content on the surface corresponds to the first boron coating portion, and a boron content at the inner grain boundary corresponds to the second boron coating portion. Referring to Table 1, the boron content of the first boron coating portion in Example 1 is 0.0755 wt % based on a total amount of the positive active material, and the boron content of the second boron coating portion is 0.0185 wt % based on the total amount of the positive active material. The weight ratio of the first boron coating portion and the second boron coating portion was calculated to be about 80:20. Furthermore, the first boron coating portion and the second boron coating portion of Example 2, in which 50% of the boron content (e.g., amount) of Example 1 is added, are calculated to have a weight ratio of about 94:6. In some embodiments, Comparative Example 3 utilizing the boron coating shows that boron is not coated inside the secondary particles of the positive active material.

Evaluation Example 4: Evaluation of Initial Discharge Capacity

The all-solid-state battery cells according to the Examples and the Comparative Examples were charged up to an upper limit voltage of 4.25 V at a constant current of 0.1 C, discharged down to a discharge cut-off voltage of 2.5 V at 0.1 C at 45° C., and measured with respect to initial discharge capacity, and the results are shown in Table 2. Referring to Table 2, Comparative Example 2 (which does not use the positive active material according to an embodiment and does not form a buffer layer) exhibits a low initial discharge capacity, but Example 1 realizes a higher initial discharge capacity even compared to Comparative Example 1 (which forms a buffer layer). In addition, in Comparative Example 3 (which includes a boron coating only on the surface of the secondary particles), boron acts resistance and thus greatly deteriorates initial charge and discharge capacity concurrently (e.g., simultaneously).

TABLE 2

| | Initial charge capacity (mAh/g) | Initial discharge capacity (mAh/g) | I.C.E. (%) |
|---|---|---|---|
| Example 1 | 233 | 213 | 91 |
| Example 2 | 235 | 215 | 91 |
| Comparative Example 1 | 230 | 188 | 82 |
| Comparative Example 2 | 226 | 176 | 78 |
| Comparative Example 3 | 223 | 182 | 81 |

Evaluation Example 5: Evaluation of Cycle-life Characteristics

Figure 12:
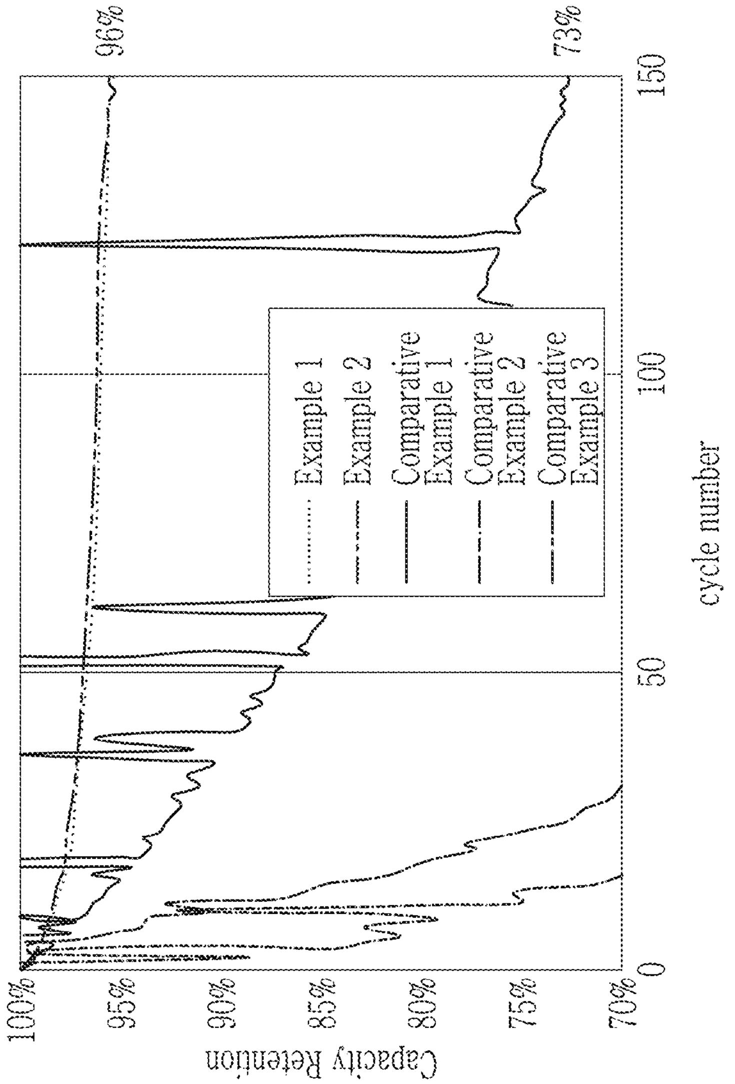
FIG. 12 is a cycle-life evaluation result for all-solid-state battery cells of examples and comparative examples.

The all-solid-state battery cells of the Examples and the Comparative Examples, which were initially charged and discharged in Evaluation Example 4, were charged and discharged 150 times at 0.33 C within a voltage range of 2.5 V to 4.25 V at 45° C. and evaluated with respect to cycle-life characteristics, and the results are shown in FIG. 12. Referring to FIG. 12, Comparative Examples 2 and 3 exhibited sharp cycle-life deterioration, but Examples 1 and 2 maintained improved capacity compared to Comparative Example 1 having a buffer layer formed in the related art method. Accordingly, Examples 1 and 2 exhibited relatively excellent or suitable cycle-life characteristics.

While this disclosure has been described in connection with what is presently considered to be practical example embodiments, it is to be understood that the present disclosure is not limited to the disclosed embodiments. Rather, it is intended to cover various modifications and equivalent arrangements included within the spirit and scope of the appended claims.

DESCRIPTION OF SOME OF THE SYMBOLS

11: secondary particle
12: inner portion of secondary particle
13: primary particle
14: outer portion of secondary particle
100: all-solid-state battery
200: positive electrode
201: positive current collector
203: positive active material layer
300: solid electrolyte layer
400: negative electrode
401: negative current collector
403: negative active material layer
400': precipitation-type negative electrode
404: lithium metal layer
405: negative electrode catalyst layer
500: elastic layer

What is claimed is:

1. A positive active material for an all-solid-state battery, the positive active material comprising:

a lithium nickel-based composite oxide, wherein the positive active material comprises a secondary particle in which a plurality of primary particles is aggregated, and at least a portion of the primary particles is arranged radially;

a first boron coating portion on a surface of the secondary particle; and a second boron coating portion on a surface of the primary particles in an interior of the secondary particle, wherein an average length of the primary particles is about 200 nm to about 500 nm.

2. The positive active material of claim 1, wherein the first boron coating portion and the second boron coating portion each independently comprise boron oxide, lithium borate, or a combination thereof.

3. The positive active material of claim 1, wherein a weight of the first boron coating portion is greater than a weight of the second boron coating portion.

4. The positive active material of claim 1, wherein an amount of the first boron coating portion is about 70 wt % to about 98 wt %, and an amount of the second boron coating portion is about 2 wt % to about 30 wt %, each based on a total weight of the first boron coating portion and the second boron coating portion.

5. The positive active material of claim 1, wherein an amount of the first boron coating portion is about 0.02 wt % to about 0.3 wt % based on a total weight of the positive active material.

6. The positive active material of claim 1, wherein an amount of the second boron coating portion is about 0.001 wt % to about 0.05 wt % based on a total weight of the positive active material.

7. The positive active material of claim 1, wherein a total amount of the first boron coating portion and the second boron coating portion is about 0.1 mol % to about 3 mol %, based on 100 mol % of the positive active material.

8. The positive active material of claim 7, wherein the total amount of the first boron coating portion and the second boron coating portion is about 0.1 mol % to about 1.5 mol %, based on 100 mol % of the positive active material.

9. The positive active material of claim 1, wherein the primary particles have a plate shape, and the at least a portion of the primary particles has a long axis arranged in a radial direction.

10. The positive active material of claim 9, wherein an average thickness of the primary particles is about 100 nm to about 200 nm, and a ratio of the average thickness to the average length is about 1:2 to about 1:5.

11. The positive active material of claim 1, wherein the secondary particle comprises an inner portion comprising an irregular porous structure and an outer portion comprising a radially arranged structure.

12. The positive active material of claim 11, wherein:
- the inner portion of the secondary particle has an average pore size larger than an average pore size of the outer portion,
- the average pore size in the inner portion of the secondary particle is about 150 nm to about 1 μm, and
- the average pore size in the outer portion of the secondary particle is less than about 150 nm.

13. The positive active material of claim 11, wherein the secondary particle comprises open pores having an average pore size of less than about 150 nm and a depth of less than or equal to about 150 nm as measured from the surface of the secondary particle toward the center of the inner portion.

14. The positive active material of claim 1, wherein the lithium nickel-based composite oxide is represented by Chemical Formula 1:

$$Li_{a1}Ni_{x1}M^1_{y1}M^2_{1-x1-y1}O_2, \text{ and} \quad \text{[Chemical Formula 1]}$$

wherein, in Chemical Formula 1,
$0.9 \leq a1 \leq 1.8$, $0.3 \leq x1 \leq 1$, $0 \leq y1 \leq 0.7$, and
$M^1$ and $M^2$ are each independently selected from Al, B, Ba, Ca, Ce, Co, Cr, Cu, F, Fe, Mg, Mn, Mo, Nb, P, S, Si, Sr, Ti, V, W, Zr, and combinations thereof.

15. A method of preparing the positive active material of claim 1, the method comprising:
- mixing a lithium raw material, a nickel-based hydroxide, and a boron raw material to obtain a resultant, and
- heat-treating the resultant.

16. The method of claim 15, wherein an amount of the boron raw material is about 0.1 mol % to about 3 mol % based on 100 mol % of the nickel-based hydroxide.

17. The method of claim 15, wherein the heat-treating is performed at a temperature of about 650° C. to about 850° C. for about 5 hours to about 20 hours.

18. An all-solid-state battery, comprising:
- a positive electrode comprising the positive active material of claim 1;
- a negative electrode; and
- a solid electrolyte layer between the positive electrode and the negative electrode.

19. The all-solid-state battery of claim 18, wherein:
- the positive electrode comprises a current collector and a positive active material layer on the current collector,
- the positive active material layer comprises the positive active material and a solid electrolyte, and
- the solid electrolyte is included in an amount of about 0.1 wt % to about 35 wt % based on a total weight of the positive active material layer.

20. The all-solid-state battery of claim 18, wherein the negative electrode comprises:
- a current collector; and
- a negative active material layer or a negative electrode catalyst layer on the current collector.

21. The all-solid-state battery of claim 18, wherein the negative electrode comprises:
- a current collector;
- a negative electrode catalyst layer on the current collector; and
- a lithium metal layer formed during initial charging between the current collector and the negative electrode catalyst layer.

* * * * *